US012612048B2

(12) United States Patent
Zhao et al.

(10) Patent No.: US 12,612,048 B2
(45) Date of Patent: Apr. 28, 2026

(54) IN-VEHICLE USER POSITIONING METHOD, IN-VEHICLE INTERACTION METHOD, VEHICLE-MOUNTED APPARATUS, AND VEHICLE

(71) Applicant: SHENZHEN YINWANG INTELLIGENT TECHNOLOGIES CO., LTD., Shenzhen (CN)

(72) Inventors: Qinsong Zhao, Dongguan (CN); Mingrui Yin, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 234 days.

(21) Appl. No.: 17/976,424

(22) Filed: Oct. 28, 2022

(65) Prior Publication Data

US 2023/0038039 A1 Feb. 9, 2023

Related U.S. Application Data

(63) Continuation of application No. PCT/CN2020/088227, filed on Apr. 30, 2020.

(51) Int. Cl.
*B60W 40/08* (2012.01)
*B60W 50/10* (2012.01)
(Continued)

(52) U.S. Cl.
CPC ............ *B60W 40/08* (2013.01); *B60W 50/10* (2013.01); *G06V 20/593* (2022.01);
(Continued)

(58) Field of Classification Search
None
See application file for complete search history.

(56) References Cited

U.S. PATENT DOCUMENTS

2012/0075336 A1* 3/2012 Oda ..................... G01C 21/367
345/629
2014/0200737 A1* 7/2014 Lortz ..................... B60R 25/25
701/1
(Continued)

FOREIGN PATENT DOCUMENTS

CN 102819009 A 12/2012
CN 104049721 A 9/2014
(Continued)

OTHER PUBLICATIONS

Translation of CN-107863106-A (Year: 2018).*
(Continued)

*Primary Examiner* — Faris S Almatrahi
*Assistant Examiner* — Selena M Jin
(74) *Attorney, Agent, or Firm* — Fish & Richardson P.C.

(57) ABSTRACT

This application provides an in-vehicle user positioning method, an in-vehicle interaction method, a vehicle-mounted apparatus, and a vehicle. In an example, the in-vehicle user positioning method includes: obtaining a sound signal collected by an in-vehicle microphone; in response to that a first voice command is recognized from the sound signal, determining a first user who sends the first voice command; and determining an in-vehicle location of the first user based on a mapping relationship between an in-vehicle user and an in-vehicle location.

15 Claims, 15 Drawing Sheets

(51) Int. Cl.
*G06V 20/59* (2022.01)
*G06V 40/16* (2022.01)

(52) U.S. Cl.
CPC ... *G06V 40/161* (2022.01); *B60W 2040/0881* (2013.01); *B60W 2540/047* (2020.02); *B60W 2540/21* (2020.02)

(56) References Cited

U.S. PATENT DOCUMENTS

| | | | | |
|---|---|---|---|---|
| 2014/0214424 A1* | 7/2014 | Wang | .................. | G06V 40/172 |
| | | | | 704/246 |
| 2015/0049010 A1 | 2/2015 | Locker et al. | | |
| 2016/0372129 A1* | 12/2016 | Nakadai | .............. | G10L 21/028 |
| 2020/0037073 A1* | 1/2020 | Augst | ..................... | G06F 3/165 |
| 2020/0075006 A1 | 3/2020 | Chen | | |
| 2020/0092649 A1 | 3/2020 | Sakurai et al. | | |
| 2020/0098355 A1 | 3/2020 | Lee et al. | | |
| 2020/0114834 A1* | 4/2020 | Endo | .................. | B60R 11/0247 |
| 2020/0135190 A1* | 4/2020 | Kaja | .................... | G06V 40/172 |
| 2020/0156539 A1* | 5/2020 | Yamamoto | ............. | G06V 20/59 |
| 2020/0317209 A1* | 10/2020 | Naiki | .................... | B60W 40/08 |
| 2021/0053516 A1* | 2/2021 | Andersson | ............. | G10L 15/26 |
| 2021/0105457 A1* | 4/2021 | Nakamura | ............. | G02B 30/22 |
| 2021/0219056 A1* | 7/2021 | Kim | ........................ | H04S 7/307 |
| 2023/0121586 A1* | 4/2023 | Ohkubo | .................. | G10L 17/22 |
| | | | | 704/246 |

FOREIGN PATENT DOCUMENTS

| | | | | | |
|---|---|---|---|---|---|
| CN | 105280183 A | | 1/2016 | | |
| CN | 105679209 A | | 6/2016 | | |
| CN | 107863106 A | * | 3/2018 | ........ | G10L 15/1815 |
| CN | 108621981 A | | 10/2018 | | |
| CN | 108790674 A | | 11/2018 | | |
| CN | 108882202 A | | 11/2018 | | |
| CN | 109493871 A | | 3/2019 | | |
| CN | 109545219 A | | 3/2019 | | |
| CN | 109710055 A | | 5/2019 | | |
| CN | 109941231 A | | 6/2019 | | |
| CN | 209105346 U | | 7/2019 | | |
| CN | 110082726 A | | 8/2019 | | |
| CN | 110223690 A | | 9/2019 | | |
| CN | 110286771 A | | 9/2019 | | |
| CN | 110390932 A | | 10/2019 | | |
| CN | 110509931 A | | 11/2019 | | |
| CN | 110718217 A | | 1/2020 | | |
| CN | 111045642 A | | 4/2020 | | |
| WO | 2017151672 A2 | | 9/2017 | | |
| WO | 2019227774 A1 | | 12/2019 | | |

OTHER PUBLICATIONS

Lv, "The Research and Implementation of Parallelization Method for Identification and Localization of Sound Source," Thesis for the degree of Master of Engineering, Jiangsu University of Science and Technology, Mar. 2016, 90 pages (with English abstract).

Snow white, "Research on the application of artificial intelligence technology in the field of intelligent transportation," Industrial and Science Tribune, vol. 18, No. 10, Oct. 2019, 3 pages (with English abstract).

Tong, "Research on target recognition and positioning method of mobile robot based on visual and auditory fusion", Thesis for the degree of Master, Nanjing University of Science and Technology, Dec. 2016, 70 pages (with English abstract).

Liu et al., "Multi-source parallelized voiceprint identification method based on deep learning," Journal of Jiangsu University of Science and Technology (Natural Science Edition), vol. 32, No. 1, Feb. 2018, 6 pages (with English abstract).

Yan, "Research on Sound Source Localization Algorithm Based on Binaural Signals in Reverberant Environment," Thesis for the degree of Master of Engineering, Chongqing University of Posts and Telecommunications, Apr. 10, 2017, 72 pages (with English abstract).

Lundkvist et al., "Signal Sound Positioning Alters Driving Performance," SAE International journal of transportation safety, Apr. 5, 2016, retrieved from URL: <DOI: https://doi.org/10.4271/2015-01-9152>, 2 pages.

Flor et al., "Characterization of Noise Level Inside a Vehicle under Different Conditions," Sensors, Apr. 9, 2020, 19 pages.

Kun, "Human-Machine Interaction for Vehicles: Review and Outlook," Foundations and Trends in Human-Computer Interaction, vol. 11, No. 4, Apr. 2018, 96 pages.

Beattie et al., "Exploring How Drivers Perceive Spatial Earcons in Automated Vehicles," Proceedings of the ACM on Interactive, Mobile, Wearable and Ubiquitous Technologies, Sep. 2017, 24 pages.

Extended European Search Report in European Appln No. 20933541.3, dated Mar. 9, 2023, 9 pages.

International Search Report and Written Opinion in International Appln. No. PCT/CN2020/088227, mailed on Jan. 27, 2021, 16 pages (with English translation).

* cited by examiner

300

500

<u>600</u>

IN-VEHICLE USER POSITIONING METHOD, IN-VEHICLE INTERACTION METHOD, VEHICLE-MOUNTED APPARATUS, AND VEHICLE

CROSS-REFERENCE TO RELATED APPLICATIONS

This application is a continuation of International Application No. PCT/CN2020/088227, filed on Apr. 30, 2020, the disclosure of which is hereby incorporated by reference in its entirety.

TECHNICAL FIELD

Embodiments of this application relate to the field of artificial intelligence, and in particular, to an in-vehicle user positioning method, an in-vehicle interaction method, a vehicle-mounted apparatus, and a vehicle.

BACKGROUND

Artificial intelligence (artificial intelligence, AI) is a theory, a method, a technology, or an application system that simulates, extends, and expands human intelligence by using a digital computer or a machine controlled by the digital computer, to sense an environment, obtain knowledge, and obtain an optimal result by using the knowledge. In other words, the artificial intelligence is a branch of computer science, and is intended to understand the essence of intelligence and produce a new intelligent machine that can react in a manner similar to human intelligence. The artificial intelligence is to study design principles and implementation methods of various intelligent machines, so that the machines have perception, inference, and decision-making functions. Researches in the field of artificial intelligence include robotics, natural language processing, computer vision, decision-making and inference, human-computer interaction, recommendation and search, an AI basic theory, and the like.

An intelligent cockpit is a mainstream application in the field of artificial intelligence, and intelligence of a head unit is an important aspect of intelligent cockpit research. In terms of functions, the head unit can implement information communication between a person and a vehicle and between the vehicle and the outside, and implement a plurality of interaction functions, for example, functions of sending and receiving SMS messages, making calls, navigation, voice control, playing music, and playing an online movie. Therefore, user experience is greatly improved. When there are a plurality of users in a vehicle, to implement personalized requirements of different users in the vehicle, a user who is performing interaction usually needs to be located. For example, a plurality of displays are disposed in the vehicle (for example, backs of seats), and the users at all locations can enjoy videos. A manner of performing interaction by using a mechanical button or a touchscreen is difficult to meet a user requirement. A voice interaction manner can reduce user operations. A user sends a voice command, and a voice assistant locates a sound source, and opens only a display corresponding to the user at a location of the sound source, so that interference to another person can be avoided, and user privacy can be protected. However, in-vehicle space is relatively small, user voices are noisy, and a requirement for positioning accuracy is relatively high. If the plurality of users in the vehicle speak at the same time, the user who sends the voice command cannot be accurately located according to an existing method. Consequently, a corresponding operation cannot be performed, which affects interaction experience.

Therefore, how to implement user positioning when there are a plurality of sound sources in the vehicle becomes an urgent problem to be resolved.

SUMMARY

This application provides an in-vehicle user positioning method, an in-vehicle interaction method, a vehicle-mounted apparatus, and a vehicle, to implement user positioning when there are a plurality of sound sources in a vehicle.

According to a first aspect, an in-vehicle user positioning method is provided, including: obtaining a sound signal collected by an in-vehicle microphone; when a first voice command is recognized from the sound signal, determining a first user who sends the first voice command; obtaining a mapping relationship between an in-vehicle user and an in-vehicle location; and determining an in-vehicle location of the first user based on the mapping relationship between an in-vehicle user and an in-vehicle location.

The in-vehicle microphone may be one microphone, or may be a plurality of microphones. For example, the plurality of microphones may be a microphone array. The microphone array may be set according to a requirement. For example, the microphone array may be a uniform circular array or a uniform linear array.

For example, the first voice command may be a wakeup keyword, and the wakeup keyword may be used to wake up a voice assistant, to activate a subsequent processing procedure.

There may be a plurality of methods of determining the first user who sends the first voice command. The manner of determining the first user is not limited in embodiments of this application.

For example, the first user corresponding to the first voice command may be determined based on a mapping relationship between a user and a voice command.

Specifically, different voice commands are preset for different users, and the voice commands are bound to the users, that is, a mapping relationship is established. For example, a mapping relationship is established between a user A and a voice command "turn on a speaker of A", and a mapping relationship is established between a user B and a voice command "turn on a speaker of B". If the first voice command is "turn on a speaker of A", it is determined that the first user who sends the first voice command is the user A.

The mapping relationship between an in-vehicle user and an in-vehicle location may be a mapping relationship between all in-vehicle users and an in-vehicle location, a mapping relationship between one in-vehicle user and an in-vehicle location, or a mapping relationship between a part of in-vehicle users and an in-vehicle location.

There may be a plurality of methods for obtaining the mapping relationship between an in-vehicle user and an in-vehicle location. For example, the mapping relationship between an in-vehicle user and an in-vehicle location may be prestored, may be obtained from other devices such as a cloud server, or may be updated in real time. The method for obtaining the mapping relationship between an in-vehicle user and an in-vehicle location is not limited in embodiments of this application.

There may be a plurality of manners of determining the mapping relationship between an in-vehicle user and an in-vehicle location.

For example, fingerprint collectors may be disposed at different in-vehicle locations. A fingerprint is collected by the fingerprint collector, and a user corresponding to the fingerprint collected by the fingerprint collector is determined based on a mapping relationship between the user and a fingerprint feature of the user. Because different fingerprint collectors correspond to different in-vehicle locations, a mapping relationship may be established between the user and the in-vehicle location. For example, a fingerprint collector A corresponds to an in-vehicle location A. The fingerprint collector A collects a fingerprint A, determines, through fingerprint recognition, that the fingerprint A corresponds to the user A, and further establishes a mapping relationship between the user A and the in-vehicle location A. A method for determining the mapping relationship between an in-vehicle user and an in-vehicle location is not limited in embodiments of this application.

According to the solution in embodiments of this application, a user who needs to interact is determined according to a voice command, and then an in-vehicle location of the user who needs to interact is determined based on mapping relationship between an in-vehicle user and an in-vehicle location. Even if a plurality of users speak at the same time, the user who needs to interact can be located. This helps implement one-to-one interaction and improve user experience.

With reference to the first aspect, in some implementations of the first aspect, the determining a first user who sends the first voice command includes: performing voiceprint feature matching on the first voice command, to recognize the first user who sends the first voice command.

According to the solution in embodiments of this application, the user who needs to interact is recognized based on a voiceprint feature, so that positioning accuracy is improved.

With reference to the first aspect, in some implementations of the first aspect, the mapping relationship between an in-vehicle user and an in-vehicle location is determined based on a face image collected by a vehicle-mounted camera.

According to the solution in embodiments of this application, the mapping relationship between the user and the in-vehicle location is determined based on the face image collected by the vehicle-mounted camera, and cooperation of the user is not needed. Therefore, the user may not be disturbed, and user experience can be improved.

With reference to the first aspect, in some implementations of the first aspect, that the mapping relationship between an in-vehicle user and an in-vehicle location is determined based on the face image collected by the vehicle-mounted camera includes: obtaining user information; determining, based on a mapping relationship between the user information and the face image, a user corresponding to the face image; and determining an in-vehicle location of the user based on a location and/or an angle of the vehicle-mounted camera.

There may be a plurality of methods of obtaining the user information. For example, the user information may be prestored, may be obtained from other devices such as a cloud server, or may be updated in real time. The method for obtaining the user information is not limited in embodiments of this application. The user corresponding to the face image is determined based on the mapping relationship between the user information and the face image, that is, facial recognition is performed on the face image, to determine the user corresponding to the face image.

The vehicle-mounted camera may be an in-vehicle camera, or may be an out-vehicle camera.

Optionally, the in-vehicle location of the user is determined based on a mapping relationship between a location of the in-vehicle camera and an in-vehicle location.

For example, a plurality of cameras are disposed at different in-vehicle locations, and the cameras at different locations are in a one-to-one correspondence with the in-vehicle locations. In this case, a mapping relationship between a location of a camera and an in-vehicle location may also be understood to be mapping relationships between different cameras and an in-vehicle location. Locations of users photographed by different cameras are in-vehicle locations corresponding to the cameras.

Optionally, the in-vehicle location of the user is determined based on a mapping relationship between a rotation angle of the in-vehicle camera and an in-vehicle location.

For example, the camera is located on an in-vehicle rearview mirror, and the rotation angle of the camera corresponds to the in-vehicle location. When a center line of a vehicle body is in a direction of 0° and the rotation angle of the camera is 0°, a corresponding in-vehicle location is the middle of a vehicle. In this case, a location of a user photographed by the camera is the middle of the vehicle. When the rotation angle of the camera is an angle A, a corresponding in-vehicle location is an in-vehicle location A. In this case, a location of a user photographed by the camera is the in-vehicle location A.

Optionally, an in-vehicle location may be indicated by an in-vehicle seat. In this way, the location/or the angle of the camera may be disposed according to the seat, so that a calculation amount can be reduced in a positioning process, and a processing speed can be improved.

With reference to the first aspect, in some implementations of the first aspect, that the mapping relationship between an in-vehicle user and an in-vehicle location is determined based on the face image collected by the vehicle-mounted camera includes: determining, based on a mapping relationship between the user information and the face image, a user corresponding to the face image; and determining an in-vehicle location of the user based on a relative location of the user in a lens of the vehicle-mounted camera.

The determining an in-vehicle location of the user based on a relative location of the user in a lens of the vehicle-mounted camera may be understood to determine the in-vehicle location of the user based on image information collected by the vehicle-mounted camera.

For example, the vehicle-mounted camera is located on an in-vehicle rearview mirror, and all in-vehicle users may be placed in a viewfinder frame during one photographing. The user corresponding to the face image and the relative location of the user in the lens are determined through facial recognition, and the in-vehicle location corresponding to the user is determined based on the relative location. For another example, the vehicle-mounted camera is located on a pillar B outside a vehicle, and vehicle-mounted cameras may be separately disposed on pillars B on two sides. For a face image collected by a camera on a left pillar B, a user corresponding to the face image and a relative location of the user in a lens are determined through facial recognition. For example, if the relative location of the user in the lens is on the right side, the user gets on the vehicle from a front door on the left side of the vehicle, and an in-vehicle location corresponding to the user may be a driver's seat.

Optionally, an in-vehicle location may be indicated by an in-vehicle seat. In this way, the relative location in the lens may be mapped to the in-vehicle seat, so that a calculation amount can be reduced in a positioning process, and a processing speed can be improved.

With reference to the first aspect, in some implementations of the first aspect, the mapping relationship between an in-vehicle user and an in-vehicle location is updated periodically.

Because a user in a cockpit may change a seat or get on/off a vehicle, the mapping relationship between an in-vehicle user and an in-vehicle location is updated periodically, so that accuracy of user positioning can be improved.

With reference to the first aspect, in some implementations of the first aspect, that the mapping relationship between an in-vehicle user and an in-vehicle location is updated periodically includes: determining, based on the mapping relationship between an in-vehicle user and an in-vehicle location, a user corresponding to a current in-vehicle location; obtaining a current face image collected by a vehicle-mounted camera; determining, based on a mapping relationship between user information and the face image, a current user corresponding to the current face image; and when the user corresponding to the current in-vehicle location is not the current user, updating the mapping relationship between an in-vehicle user and an in-vehicle location.

For example, the updating step includes: determining, based on the mapping relationship between an in-vehicle user and an in-vehicle location, that there is no user at the current in-vehicle location; obtaining the current face image collected by the vehicle-mounted camera; determining, based on the mapping relationship between the user information and the face image, the current user corresponding to the current face image; establishing a mapping relationship between the current user and the current in-vehicle location; and updating the mapping relationship between an in-vehicle user and an in-vehicle location.

For another example, the updating step includes: determining, based on the mapping relationship between an in-vehicle user and an in-vehicle location, that the user corresponding to the current in-vehicle location is the user A; obtaining the current face image collected by the vehicle-mounted camera; determining, based on the mapping relationship between the user information and the face image, that the current user corresponding to the current face image is the user B; and when the user A and the user B are not a same person, establishing a mapping relationship between the user B and the current in-vehicle location, and updating the mapping relationship between an in-vehicle user and an in-vehicle location.

With reference to the first aspect, in some implementations of the first aspect, the method further includes: performing sound source positioning based on the sound signal, to obtain at least one sound source location; and correcting the in-vehicle location of the first user based on the in-vehicle location of the first user and the at least one sound source location.

Specifically, the sound source positioning may be performed on the sound signal by using a sound source positioning method based on a microphone array. For example, the sound source positioning method may be a MUSIC algorithm. The microphone array may be set according to a requirement. For example, the microphone array may be a uniform circular array or a uniform linear array.

According to the solution in embodiments of this application, sound source positioning is performed, so that accuracy of the in-vehicle location of the first user can be further improved. In addition, a user who needs to interact can be accurately located in a noisy environment in a vehicle.

With reference to the first aspect, in some implementations of the first aspect, the correcting the in-vehicle location of the first user based on the in-vehicle location of the first user and the at least one sound source location includes: determining, as a corrected in-vehicle location of the first user, a sound source location that is in the at least one sound source location and that is closest to the in-vehicle location of the first user.

For example, if an in-vehicle location of the first user before correction is an angle range, a sound source location that is in the at least one sound source location and that falls within the angle range is used as a corrected in-vehicle location of the first user.

For another example, if an in-vehicle location of the first user before correction is an angle value, a sound source location that is in the at least one sound source location and that is closest to the angle value is used as a corrected in-vehicle location of the first user.

According to a second aspect, an in-vehicle interaction method is provided, including: obtaining a sound signal collected by an in-vehicle microphone; when a first voice command is recognized from the sound signal, determining a first user who sends the first voice command; obtaining a mapping relationship between an in-vehicle user and an in-vehicle location; determining an in-vehicle location of the first user based on the mapping relationship between an in-vehicle user and an in-vehicle location; and executing the first voice command based on the in-vehicle location of the first user.

The in-vehicle microphone may be one microphone, or may be a plurality of microphones. For example, the plurality of microphones may be a microphone array. The microphone array may be set according to a requirement. For example, the microphone array may be a uniform circular array or a uniform linear array.

For example, the first voice command may be a wakeup keyword, and the wakeup keyword may be used to wake up a voice assistant, to activate a subsequent processing procedure.

Optionally, the first user corresponding to the first voice command may be determined based on a mapping relationship between a user and a voice command.

Specifically, different voice commands are preset for different users, and the voice commands are bound to the users, that is, a mapping relationship is established. For example, a mapping relationship is established between a user A and a voice command "turn on a speaker of A", and a mapping relationship is established between a user B and a voice command "turn on a speaker of B". If the first voice command is "turn on a speaker of A", it is determined that the first user who sends the first voice command is the user A.

According to the solution in embodiments of this application, a user who needs to interact is determined according to a voice command, and then an in-vehicle location of the user who needs to interact is determined based on the mapping relationship between an in-vehicle user and an in-vehicle location. Even if a plurality of users speak at the same time, the user who needs to interact can be located, and the voice command can be executed based on a user location. This helps implement one-to-one interaction and improve user experience.

With reference to the second aspect, in some implementations of the second aspect, the executing the first voice command based on the in-vehicle location of the first user includes: controlling a location of a projection interface based on the in-vehicle location of the first user.

The projection interface may be configured to display a projected image.

For example, the location of the projection interface may be controlled according to a rotation angle of a projector component. The projector component may include a projection frame and a steering motor. The projection frame may be configured to project, for example, display a three-dimensional image of a voice assistant. The three-dimensional image is displayed on the projection interface, that is, a location of the three-dimensional image may be controlled based on the in-vehicle location of the first user.

The first voice command is not necessarily a command for controlling the location of the projection interface, that is, the first voice command may be any voice command. For example, the first voice command may be adjusting a temperature of an air conditioner. In this case, executing the first voice command includes adjusting the temperature of the air conditioner and controlling the location of the projection interface.

According to the solution in embodiments of this application, the projected image can be displayed on the projection interface, and the location of the projection interface can be adjusted based on an in-vehicle location, so that the projected image can face a user who needs to interact, and one-to-one interaction experience can be provided for the user.

With reference to the second aspect, in some implementations of the second aspect, the executing the first voice command based on the in-vehicle location of the first user includes: controlling a speaker corresponding to the in-vehicle location of the first user.

For example, the first voice command may be playing music. The controlling a speaker corresponding to the in-vehicle location of the first user may include turning on the speaker, playing corresponding music, and the like.

With reference to the second aspect, in some implementations of the second aspect, the executing the first voice command based on the in-vehicle location of the first user includes: controlling an air conditioner corresponding to the in-vehicle location of the first user.

For example, the first voice command is turning on the air conditioner. The controlling an air conditioner corresponding to the in-vehicle location of the first user may include turning on the air conditioner corresponding to the in-vehicle location of the first user.

The foregoing is merely an application example of the in-vehicle interaction method. The in-vehicle interaction method in embodiments of this application may be further applied to another scenario in which a user needs to be located.

According to a third aspect, a vehicle-mounted apparatus is provided, including: a storage unit, configured to store a mapping relationship between an in-vehicle user and an in-vehicle location; and a processing unit, configured to: obtain a sound signal collected by an in-vehicle microphone; when a first voice command is recognized from the sound signal, determine a first user who sends the first voice command; obtain the mapping relationship between an in-vehicle user and an in-vehicle location; and determine an in-vehicle location of the first user based on the mapping relationship between an in-vehicle user and an in-vehicle location.

With reference to the third aspect, in some implementations of the third aspect, the processing unit is specifically configured to: perform voiceprint feature matching on the first voice command, to recognize the first user who sends the first voice command.

With reference to the third aspect, in some implementations of the third aspect, the mapping relationship between an in-vehicle user and an in-vehicle location is determined based on a face image collected by a vehicle-mounted camera.

With reference to the third aspect, in some implementations of the third aspect, that the mapping relationship between an in-vehicle user and an in-vehicle location is determined based on a location of the camera and the face image collected by the camera includes: obtaining user information; determining, based on a mapping relationship between the user information and the face image, a user corresponding to the face image; and determining an in-vehicle location of the user based on a location and/or an angle of the camera.

With reference to the third aspect, in some implementations of the third aspect, the processing unit is further configured to: perform sound source positioning based on the sound signal, to obtain at least one sound source location; and correct the in-vehicle location of the first user based on the in-vehicle location of the first user and the at least one sound source location.

With reference to the third aspect, in some implementations of the third aspect, the processing unit is specifically configured to determine, as a corrected in-vehicle location of the first user, a sound source location that is in the at least one sound source location and that is closest to the in-vehicle location of the first user.

With reference to the third aspect, in some implementations of the third aspect, the processing unit is further configured to: execute the first voice command based on the in-vehicle location of the first user.

With reference to the third aspect, in some implementations of the third aspect, the processing unit is specifically configured to: control a location of a projection interface based on the in-vehicle location of the first user.

According to a fourth aspect, a vehicle is provided, including the apparatus in the third aspect.

According to a fifth aspect, a vehicle-mounted apparatus is provided, including an input/output interface, a processor, and a memory. The processor is configured to control the input/output interface to send/receive information. The memory is configured to store a computer program. The processor is configured to invoke and run the computer program from the memory, so that the vehicle-mounted apparatus performs the method according to the first aspect or the second aspect.

Optionally, the apparatus may be a terminal device/server, or may be a chip in the terminal device/server.

Optionally, the memory may be located in the processor, for example, may be a cache (cache) in the processor. The memory may alternatively be located outside the processor and independent of the processor, for example, may be an internal memory (memory) of the apparatus.

It should be understood that the first aspect includes any implementation of the first aspect, the second aspect includes any implementation of the second aspect, and the third aspect includes any implementation of the third aspect.

According to a sixth aspect, a computer program product is provided. The computer program product includes computer program code. When the computer program code is run on a computer, the computer is enabled to perform the methods according to the foregoing aspects.

It should be noted that some or all of the computer program code may be stored in a first storage medium. The first storage medium may be encapsulated with a processor, or may be encapsulated separately from a processor. This is not specifically limited in embodiments of this application.

According to a seventh aspect, a computer-readable medium is provided. The computer-readable medium stores program code. When the computer program code is run on a computer, the computer is enabled to perform the methods according to the foregoing aspects.

According to a ninth aspect, a chip is provided. The chip includes a processor and a data interface. The processor reads, through the data interface, instructions stored in a memory, to perform the method according to the foregoing aspects.

Optionally, in an implementation, the chip may further include a memory and the memory stores instructions. The processor is configured to execute the instructions stored in the memory. When the instructions are executed, the processor is configured to perform the method according to the foregoing aspects.

DESCRIPTION OF EMBODIMENTS

The following describes technical solutions of this application with reference to accompanying drawings.

Figure 1:
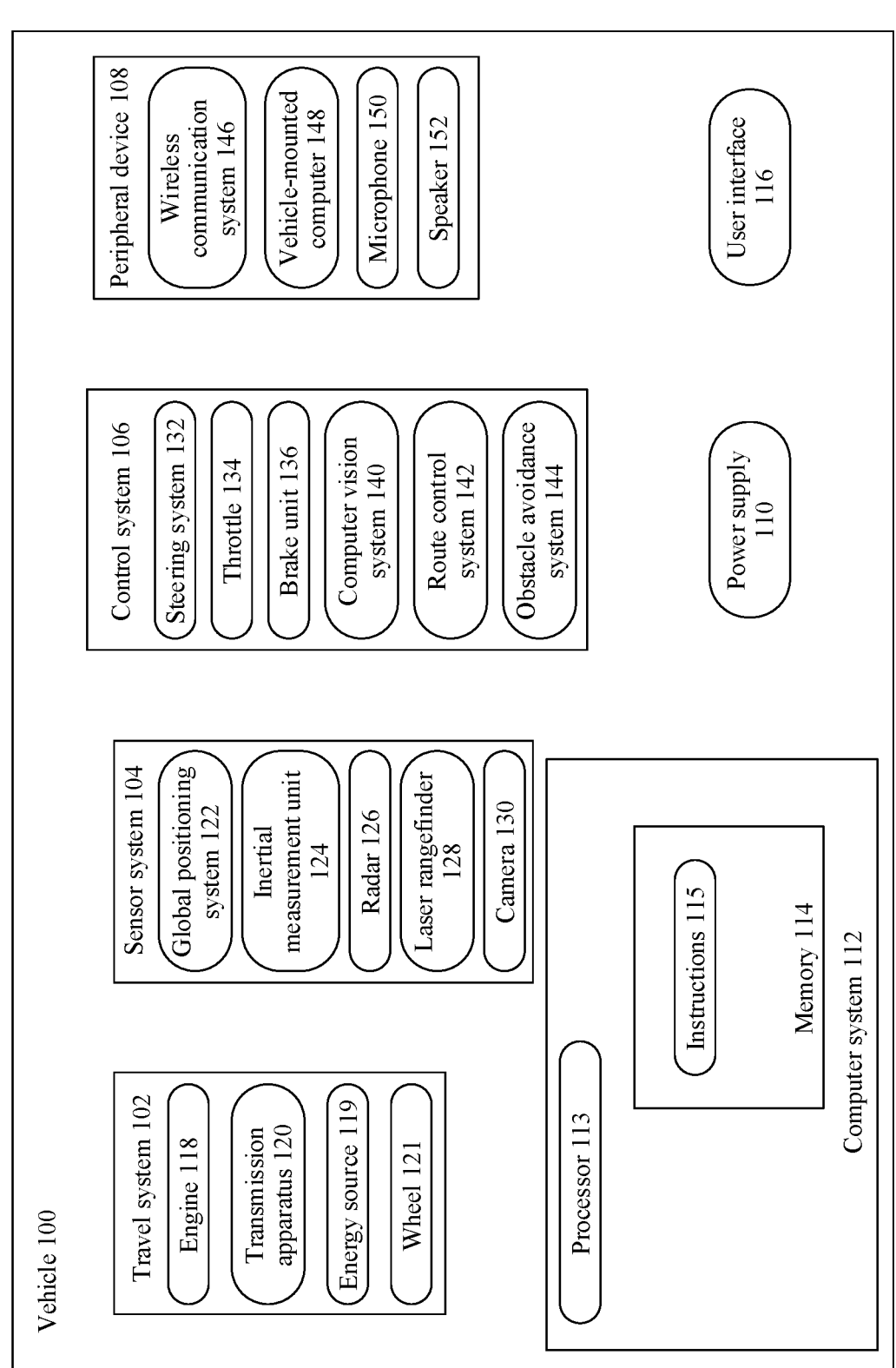
FIG. 1 is a schematic diagram of a vehicle according to an embodiment of this application.

FIG. 1 is a functional block diagram of a vehicle 100 according to an embodiment of the present invention.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, each subsystem and member of the vehicle 100 may be interconnected in a wired or wireless manner.

The travel system 102 may include a component that provides power for the vehicle 100 to move. In an embodiment, the travel system 102 may include an engine 118, an energy source 119, a transmission apparatus 120, and wheels/tires 121.

The sensor system 104 may include several sensors that sense information about an ambient environment of the vehicle 100. For example, the sensor system 104 may include a positioning system 122 (the positioning system may be a GPS, a BeiDou system, or another positioning system), an inertial measurement unit (inertial measurement unit, IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. One or more pieces of sensor data from these sensors may be used to detect objects and corresponding features (a location, a shape, a direction, a speed, and the like) of the objects. Such detection and recognition are key functions of safe operations of the autonomous vehicle 100.

The control system 106 controls operations of the vehicle 100 and components of the vehicle 100. The control system 106 may include various members, including a steering system 132, a throttle 134, a brake unit 136, a sensor fusion algorithm, a computer vision system 140, a route control system 142, and an obstacle avoidance system 144.

The computer vision system 140 may be operated to process and analyze an image captured by the camera 130, to recognize objects and/or features in the ambient environment of the vehicle 100. The objects and/or features may include traffic signals, road boundaries, and obstacles. In this embodiment of this application, the computer vision system 140 may be further operated to process and analyze an image captured by the camera 130, to recognize a user and/or a feature in an internal environment of the vehicle 100. The computer vision system 140 may use an object recognition algorithm, a face recognition algorithm, a structure from motion (SFM) algorithm, video tracking, and another computer vision technology.

Certainly, in an example, the control system 106 may add or alternatively include components in addition to those shown and described, or some of the shown components may be removed from the control system 106.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information to the user of the vehicle 100. The user interface 116 may further operate the vehicle-mounted computer 148 to receive an input of the user. The vehicle-mounted computer 148 may perform operations through a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. In this embodiment of this application, the vehicle-mounted computer 148 may perform an operation by receiving a voice command or another audio input of the user. Similarly, the speaker 152 may output audio to the user of the vehicle 100.

The power supply 110 may provide power to various components of the vehicle 100. Some or all of functions of the vehicle 100 are controlled by the computer system 112. The computer system 112 may include at least one processor 113. The processor 113 executes instructions 115 stored in a non-transitory computer-readable medium such as a data storage apparatus 114. The computer system 112 may alternatively be a plurality of computing devices that control an individual component or a subsystem of the vehicle 100 in a distributed manner.

The processor 113 may be any conventional processor, for example, a commercially available CPU. Alternatively, the processor may be a dedicated device such as an ASIC or another hardware-based processor. Although FIG. 1 functionally illustrates the processor, the memory, and other elements of the computer in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer. Therefore, a reference to the processor or the computer is understood to include a reference to a set of processors or computers or memories that may or may not operate in parallel. Different from using a single processor to perform the steps described herein, some components such as a steering component and a deceleration component each may include a respective processor. The processor performs only computation related to a component-specific function.

In various aspects described herein, the processor may be located far away from the vehicle and perform wireless communication with the vehicle. In other aspects, some of the processes described herein are performed on the processor disposed inside the vehicle, while others are performed by a remote processor. The processes include necessary steps for performing a single operation.

In some embodiments, the data storage apparatus 114 may include the instructions 115 (for example, program logic), and the instructions 115 may be executed by the processor 113 to perform various functions of the vehicle 100, including the functions described above. The data storage apparatus 114 may also include additional instructions, for example, instructions for sending data to, receiving data from, interacting with, and/or controlling one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode. In this embodiment of this application, the data storage apparatus 114 may further store related information of the user. Such information may be used by the vehicle 100 and the computer system 112 during human-computer interaction.

The user interface 116 is configured to provide information to or receive information from the user of the vehicle 100. Optionally, the user interface 116 may include one or more input/output devices in a set of peripheral devices 108, for example, the wireless communication system 146, the vehicle-mounted computer 148, the microphone 150, and the speaker 152.

The computer system 112 may control the functions of the vehicle 100 based on inputs received from the various subsystems (for example, the travel system 102, the sensor system 104, and the control system 106) and from the user interface 116. For example, the computer system 112 may use an input from the user interface 116 to control the peripheral device 108 to implement human-computer interaction. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the data storage apparatus 114 may be partially or completely separated from the vehicle 100. The foregoing components may be communicatively coupled together in a wired and/or wireless manner.

Optionally, the foregoing components are merely examples. In actual application, components in the foregoing modules may be added or removed according to an actual requirement. FIG. 1 should not be construed as a limitation on this embodiment of the present invention.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present invention.

The in-vehicle user positioning method provided in embodiments of this application can be applied to all scenarios in which an in-vehicle user needs to be located. Specifically, the in-vehicle user positioning method provided in embodiments of this application can be applied to scenarios in which the in-vehicle user needs to be located, such as music playing, air conditioner control, seat heating, and seat adjustment. The following briefly describes two common application scenarios.

Application Scenario 1: Music Playing

The speakers 152 in FIG. 1 may be distributed in a plurality of locations in the vehicle. Specifically, speakers in different locations may be separately controlled to play different music, so that a function of playing music according to a location is implemented. Therefore, users in different locations can turn on/off speakers, play different music, or the like as required. For example, when a user needs to play music, the user may send a voice command. A voice assistant or the like may locate the user who sends the voice command, and control a speaker near the user according to the voice instruction, for example, turn on the speaker and play corresponding music.

The user who sends the voice command may be located according to the in-vehicle user positioning method in embodiments of this application. Even if a plurality of users in the vehicle speak at the same time, the in-vehicle user positioning method in embodiments of this application can be used to accurately locate a user who sends a voice command, and further control a speaker near the user according to the voice instruction. In this way, normal communication of other users is not affected, and accuracy of positioning an in-vehicle user is improved, so that interference to others is avoided and requirements of different users are met.

Application Scenario 2: Air Conditioner Control

The vehicle 100 in FIG. 1 may further include air conditioners, and the air conditioners may be distributed at a plurality of locations in the vehicle. Specifically, air conditioners at different locations may be separately controlled to adjust temperatures at different locations, to implement a function of controlling an air conditioner according to a location, so that users at different locations can adjust nearby temperatures as required. For example, when the user needs to adjust a temperature of an air conditioner, the user may send a voice command. The voice assistant or the like may locate the user who sends the voice command, control an air conditioner near the user based on the voice instruction, and adjust a temperature of the air conditioner according to a requirement of the user.

The user who sends the voice command may be located according to the in-vehicle user positioning method in embodiments of this application. Even if a plurality of users in the vehicle speak at the same time, the in-vehicle user positioning method in embodiments of this application can be used to accurately locate a user who sends a voice command, and control an air conditioner near the user according to the voice instruction. In this way, normal communication of other users is not affected, and accuracy of positioning an in-vehicle user is improved, so that interference to others is avoided and requirements of different users are met.

It should be understood that the foregoing application scenarios are merely examples. For other functions that can be implemented according to a location in the vehicle, the in-vehicle user positioning method provided in embodiments of this application may be used to locate a user who needs to use a corresponding function, and the corresponding function is enabled as required, so that interaction experience of the user is improved.

To facilitate understanding of embodiments of this application, the following first describes related concepts of related terms in embodiments of this application.

(1) Multiple Signal Classification (Multiple Signal Classification, MUSIC) Algorithm The MUSIC algorithm calculates energy distribution of signals at different angles by using orthogonality of signal subspace and noise subspace, and then locates a signal peak. The algorithm generates a plurality of peak values when a plurality of persons speak at different angles at the same time.

Figure 2:
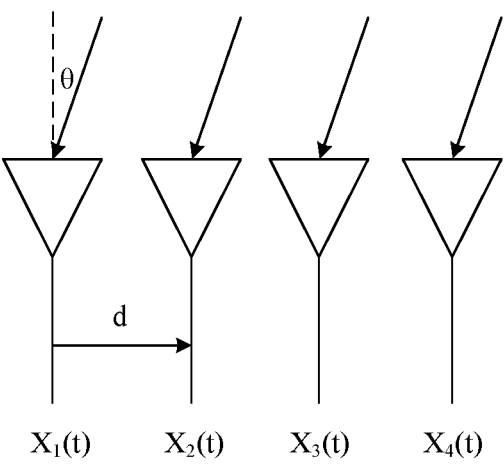
FIG. 2 is a schematic diagram of a structure of a microphone array according to an embodiment of this application.

It is assumed that there are D sound sources, that is, D persons speak at the same time. M microphones form a microphone array. FIG. 2 is a schematic diagram of a structure of a microphone array. In FIG. 2, M is 4, that is, the microphone array consists of four microphones with a spacing of d.

A signal received by the microphone array may be shown in formula (1):

$$X(t)=AS(t)+N(t) \tag{1}$$

X(t) indicates the received signal, t indicates time, S(t) indicates signal strength of a signal source on an array element, A indicates impact of different microphones on the received signal and is a function of an angle θ, θ is an included angle between the received signal and a normal line of the microphone array, namely, an azimuth of the signal, and N(t) indicates noise. A covariance matrix includes the signal subspace and the noise subspace, and may be specifically shown in formula (2):

$$R(t)=AR_SA^H+\sigma^2I \tag{2}$$

R(t) indicates the covariance matrix, H represents matrix conjugate transpose, $\sigma^2$ indicates a noise power, I indicates an M*M-order identity matrix, and $R_S$ indicates a correlation matrix of a signal.

According to a sample, an estimated value of a maximum likelihood may be obtained, as shown in formula (3):

$$R_x = \frac{1}{N}\sum_{i=1}^{N}X(i)X^H(i) \tag{3}$$

$R_x$ indicates the estimated value of the maximum likelihood, and N indicates a quantity of samples.

Figure 3:
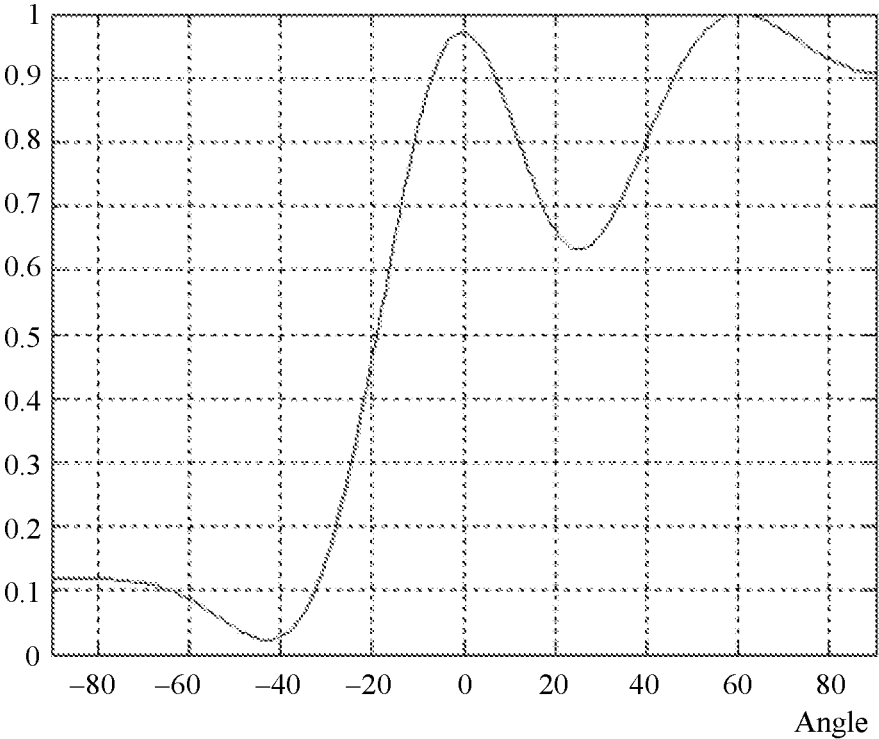
FIG. 3 is a schematic diagram of an energy spectrum according to an embodiment of this application.

Eigen-decomposition is performed on the covariance matrix, and eigenvalues obtained after the decomposition are sorted by size. The first D eigenvalues are eigenvalues related to a signal, the last M-D eigenvalues are noise space, and eigenvectors of these eigenvalues constitute a noise matrix $E_n=[v_{D+1},v_{D+2}, \ldots v_M]$. In the noise matrix, $v_{D+1}$ represents a $(D+1)^{th}$ eigenvalue, $v_{D+2}$ represents a $(D+2)^{th}$ eigenvalue, and $v_M$ represents an $M^{th}$ eigenvalue. Distribution of an angle θ in an energy spectrum is specifically shown in formula (4):

$$P_{music}(\theta) = \frac{1}{a^H(\theta)E_nE_n^Ha(\theta)} \tag{4}$$

a (θ) is a response of a microphone to a signal source whose azimuth is θ, and $P_{music}(\theta)$ is an energy spectrum. The energy spectrum includes one or more peak values, and a location of a sound source is found by searching a wave peak. That is, a plurality of sound sources at a same moment may be displayed in the energy spectrum. FIG. 3 is a schematic diagram of an energy spectrum when a plurality of people speak at the same time. In FIG. 3, two persons speak at locations 0° and 60° relative to the microphone array at the same time.

(2) Neural Network

The neural network may include a neuron. The neuron may be an operation unit that uses $x_s$ and an intercept 1 as inputs. An output of the operation unit may be shown in formula (5):

$$h_{W,b}(x) = f(W^Tx) = f\left(\sum_{s=1}^{n}W_sx_s + b\right) \tag{5}$$

In the formula, s=1, 2, . . . , or n, where n indicates a natural number greater than 1, $W_s$ indicates a weight of $x_s$, b indicates a bias of the neuron, and f is an activation function (activation function) of the neuron. The activation function is used to perform non-linear transformation on a feature in the neural network, to convert an input signal in the neuron into an output signal. The output signal of the activation function may serve as an input of a next convolution layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(3) Deep Neural Network

The deep neural network (deep neural network, DNN) is also referred to as a multi-layer neural network, and may be understood to be a neural network with a plurality of hidden layers. The DNN is divided based on locations of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

The DNN seems complex, but work of each layer is not complex. Simply speaking, the DNN is shown in the following linear relationship expression: $\vec{y}=\alpha(W\cdot\vec{x}+\vec{b})$ where $\vec{x}$ indicates an input vector, $\vec{y}$ indicates an output vector, $\vec{b}$ indicates an offset vector, W indicates a weight matrix (also referred to as a coefficient), and $\alpha()$ is an activation function. At each layer, only such a simple operation is performed on the input vector $\vec{x}$ to obtain the output vector $\vec{y}$. Because there are a large quantity of DNN layers, there are also a relatively large quantity of coefficients W and offset vectors $\vec{b}$. Definitions of these parameters in the DNN are as follows: The coefficient W is used as an example. It is assumed that in a three-layer DNN, a linear coefficient from a fourth neuron at a second layer to a second neuron at a third layer is defined as $$W_{24}^{3}.$$

The superscript 3 represents a quantity of layers at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as:

$$W_{jk}^{L}.$$

It should be noted that there is no parameters W at the input layer. In the deep neural network, more hidden layers allow the network to better describe a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix (a weight matrix formed by vectors W of many layers) of all layers of the trained deep neural network.

(4) Loss Function

In a process of training a deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, the difference between the predicted value and the target value" needs to be predefined. This is the loss function (loss function) or an objective function (objective function). The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

A neural network may correct a value of a parameter in an initial neural network model in a training process by using an error back propagation (back propagation, BP) algorithm, so that a reconstruction error loss of the neural network model becomes increasingly smaller. Specifically, an input signal is forward transmitted until an error loss is generated in an output, and the parameter of the initial neural network model is updated through back propagation of information about the error loss, to converge the error loss. The back propagation algorithm is a back propagation motion dominated by the error loss, and is intended to obtain an optimal parameter, for example, a weight matrix, of the neural network model.

Currently, a sound source positioning system is usually configured to locate the in-vehicle user. The sound source positioning system mainly includes a sound source positioning system based on the microphone array and a sound source positioning system based on a human auditory mechanism. The sound source positioning system based on the microphone array means that a sound signal is picked up by using a microphone, and each output signal of the microphone array is analyzed and processed, to obtain location information of one or more sound sources. However, when a plurality of users speak in the vehicle, the foregoing solutions cannot distinguish one or more users who make a voice. When the foregoing solutions are applied to human-computer interaction, the system cannot determine a direction in which interaction needs to be performed, and cannot provide one-to-one interaction experience.

Figure 4:
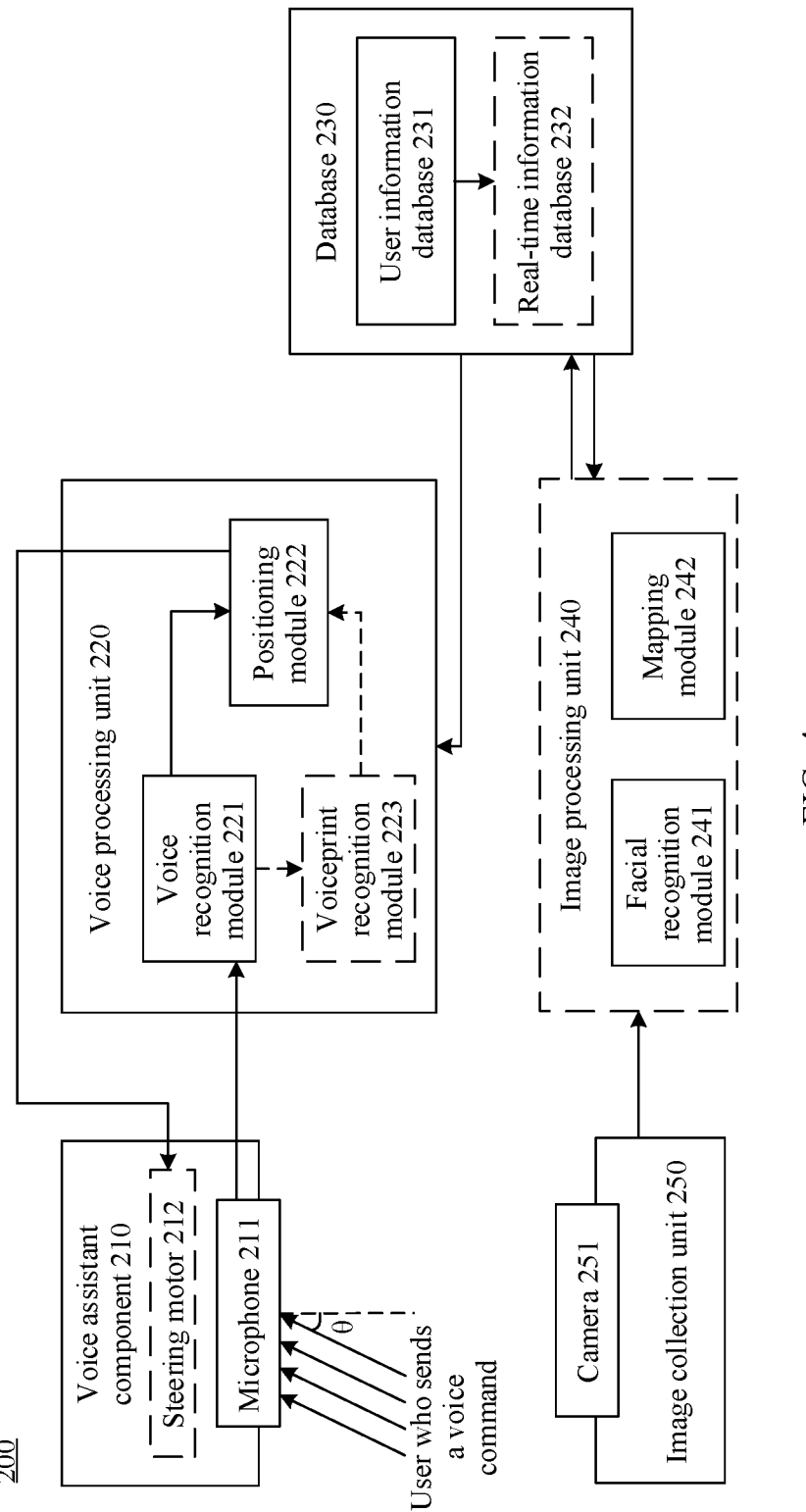
FIG. 4 is a schematic diagram of a structure of an in-vehicle system according to an embodiment of this application.

FIG. 4 is a schematic diagram of a structure of an in-vehicle system according to an embodiment of this application. An in-vehicle system 200 in FIG. 4 includes a voice assistant component 210, a voice processing unit 220, and a database 230.

The voice assistant component 210 includes a microphone 211. The microphone 211 may be an energy conversion device that converts a sound signal into an electrical signal. For example, the microphone 211 may be a microphone array. The microphone array refers to an array formed by a plurality of microphones at a distance, for example, a linear array or a circular array. A sound signal collected by the microphone 211 may be transmitted to the voice processing unit 220 for processing.

In some embodiments, the voice assistant component 210 may further include a steering motor 212. For example, the steering motor 212 may be a stepper motor that controls rotation. For example, the steering motor 212 may be a stepper motor configured to control rotation of a 3D projector component. The steering motor 212 may receive location information sent by a positioning module 222, and rotate correspondingly.

The voice processing unit 220 includes a voice recognition module 221 and the positioning module 222.

The voice recognition module 221 is configured to recognize a voice command in the sound signal collected by the microphone.

For example, the voice command may be a wakeup word. The wake-up word may be used to activate a processing procedure of the system 200.

For example, after the voice command is recognized, a user who sends the voice command is determined based on a mapping relationship between a voice command and a user. That is, different voice commands may be set for different users.

Optionally, the voice processing unit 220 may further include a voiceprint recognition module 223. The voiceprint recognition module 223 is configured to recognize a user based on sound wave characteristics of the speaking user. In this case, after recognizing the voice command, the voice recognition module 221 may send the sound signal to the voiceprint recognition module 223. The voiceprint recognition module 223 may be configured to perform voiceprint recognition on the voice command based on a mapping relationship between a user and a voiceprint feature of the user, and determine the user who sends the voice command.

For example, the voiceprint recognition includes sound signal processing, voiceprint feature extraction, voiceprint comparison and discrimination decision, and the like.

For example, the voiceprint feature extraction is to extract and select an acoustic or linguistic feature that has characteristics such as strong separability and high stability for a voiceprint of a speaker.

For example, the voiceprint comparison and discrimination decision refer to voiceprint pattern matching (voiceprint pattern recognition). Specifically, the voiceprint comparison and discrimination decision is a process of searching and matching between the extracted feature data of the voiceprint and a feature template (voiceprint feature) stored in the database 230. For example, a neural network method, a nearest neighbor method, or the like may be used.

It should be understood that the voiceprint recognition module 223 may be deployed in a vehicle, or the voiceprint recognition module 223 may alternatively be deployed in a cloud.

It should be further understood that the voiceprint recognition module 223 is merely an example for description. The voiceprint recognition module 223 is configured to recognize the user by collecting a voice of the speaking user. The voiceprint recognition module 223 may be in any form. This is not limited in this embodiment of this application.

The positioning module 222 may determine, based on a mapping relationship between an in-vehicle user and an in-vehicle location, an in-vehicle location of the user who sends the voice command, namely, a location of a user who needs to interact. The mapping relationship between an in-vehicle user and an in-vehicle location may be stored in the database 230.

Further, the positioning module 222 may feed location information back to the voice assistant component 210, so that the voice assistant component 210 performs a subsequent operation, for example, controls the steering motor 212 to rotate.

Further, the positioning module 222 may be further configured to locate a sound source and obtain at least one sound source location. For example, the voice recognition module may transmit the sound signal collected by the microphone to the positioning module 222, to locate the sound source.

Sound source positioning is to locate a direction and a distance of one or more sound sources based on the sound signal. For example, sound source positioning may be implemented by using methods such as a MUSIC algorithm and a time difference of arrival (time difference of arrival, TDOA) method.

For example, the positioning module 222 may correct, based on an in-vehicle location obtained by the voiceprint recognition module 223 and the at least one sound source location obtained by positioning the sound source, a location of the user who sends the voice command, to obtain a more accurate in-vehicle location θ that needs to interact.

It should be understood that the positioning module 222 may be deployed in a vehicle, or the positioning module 222 may alternatively be deployed in a cloud.

It should be further understood that the positioning module 222 is merely an example for description. The positioning module 222 may be configured to locate the user by collecting a sound signal of the speaking user. A sound source positioning manner may be in any form. This is not limited in this embodiment of this application.

Optionally, the system 200 may further include an image collection unit 250 and an image processing unit 240.

The image collection unit 250 includes a camera 251. The camera 251 may have basic functions such as obtaining video recording/transmission or capturing a static image. After an image is collected by a lens, a photosensitive component circuit and a control component in the camera process the image and convert the image into a digital signal for subsequent signal processing.

Specifically, the image collection unit 250 may send the collected face image to the image processing unit 240.

The image processing unit 240 includes a facial recognition module 241.

The facial recognition module 241 is configured to recognize the user based on a face image of the user. Specifically, the facial recognition module 241 may be configured to determine the user corresponding to the face image based on a mapping relationship between a user and a facial feature of the user. The mapping relationship between a user and a facial feature of the user may be stored in the database 230.

For example, facial recognition includes face image preprocessing, face image feature extraction, and face image matching and recognition.

For example, face image preprocessing refers to a process of processing an image based on a face detection result and finally serving the feature extraction. For example, because of restrictions of various conditions and random interference, an original image obtained by the system cannot be directly used, and image preprocessing such as grayscale correction and noise filtering usually needs to be performed on the original image in an early stage of image processing.

For example, the foregoing face feature extraction method may include: a knowledge-based representation method and an algebraic feature or statistical learning-based representation method.

For example, the face image matching and recognition refers to a process of searching the extracted feature data of a face image and matching the feature data with a feature template (face feature) stored in the database 230. A preset threshold is set, and when a similarity exceeds the preset threshold, a matching result is output. The facial recognition is to compare a to-be-recognized facial feature with the obtained facial feature template, and determine, based on the similarity, a user corresponding to a face.

It should be understood that the facial recognition module 241 may be deployed in a vehicle, or the facial recognition module 241 may alternatively be deployed in a cloud.

It should be further understood that the facial recognition module 241 is merely an example for description. The facial recognition module 241 is configured to recognize the user by collecting an image of the user. The facial recognition module 241 may be in any form. This is not limited in this embodiment of this application.

Optionally, the image processing unit 240 further includes a mapping module 242. The mapping module 242 may establish a mapping relationship between an in-vehicle location of a user and the user, and store a mapping relationship between an in-vehicle user and an in-vehicle location in the database 230. The in-vehicle location of the user may be determined based on an angle and/or a location of the camera 251.

Optionally, the image processing unit 240 may be further configured to periodically update the mapping relationship between an in-vehicle user and an in-vehicle location.

For example, the database 230 may include a user information database 231. The user information database 231 may be configured to store the mapping relationship between a user and a voiceprint feature of the user and the mapping relationship between a user and a facial feature of the user. For example, the user information database 231 may store information about all users registered on a head unit.

For example, the database 230 may further include a real-time information database 232. The real-time information database 232 may be configured to store the mapping relationship between an in-vehicle user and an in-vehicle location. For example, a mapping relationship between users may be determined based on a face image collected by the camera. For example, based on data in the user information database 231, the user may be indicated based on voiceprint information of the user. Specifically, a mapping relationship between a voiceprint feature of the user and an in-vehicle location may be obtained based on the mapping relationship between a user and a voiceprint feature of the user and the mapping relationship between an in-vehicle user and an in-vehicle location. In other words, the real-time information database 232 may be configured to store the mapping relationship between a voiceprint feature of a user and an in-vehicle location. In this case, the positioning module 222 may match the voiceprint feature of the user in the real-time information database 232, and further determine the in-vehicle location of the user. The mapping relationship between a voiceprint feature of a user and an in-vehicle location may be updated as the mapping relationship between an in-vehicle user and an in-vehicle location is updated.

Figure 5:
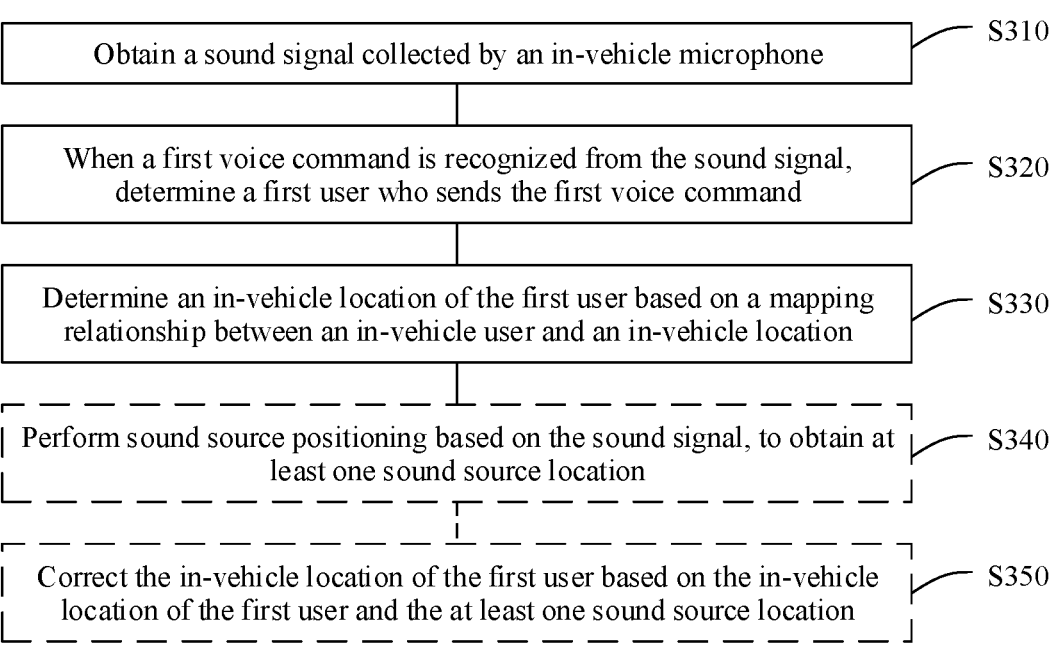
FIG. 5 is a schematic flowchart of an in-vehicle user positioning method according to an embodiment of this application.

The following describes in detail an in-vehicle user positioning method provided in an embodiment of this application with reference to FIG. 5.

FIG. 5 shows an in-vehicle user positioning method 300 according to an embodiment of this application. The in-vehicle user positioning method 300 may be performed by an apparatus or a system that can perform in-vehicle user positioning, for example, may be performed by the in-vehicle system 200 shown in FIG. 4. The method 300 includes step S310 to step S350. The following describes the step 310 to the step 350 in detail.

S310: Obtain a sound signal collected by an in-vehicle microphone.

Figure 6:
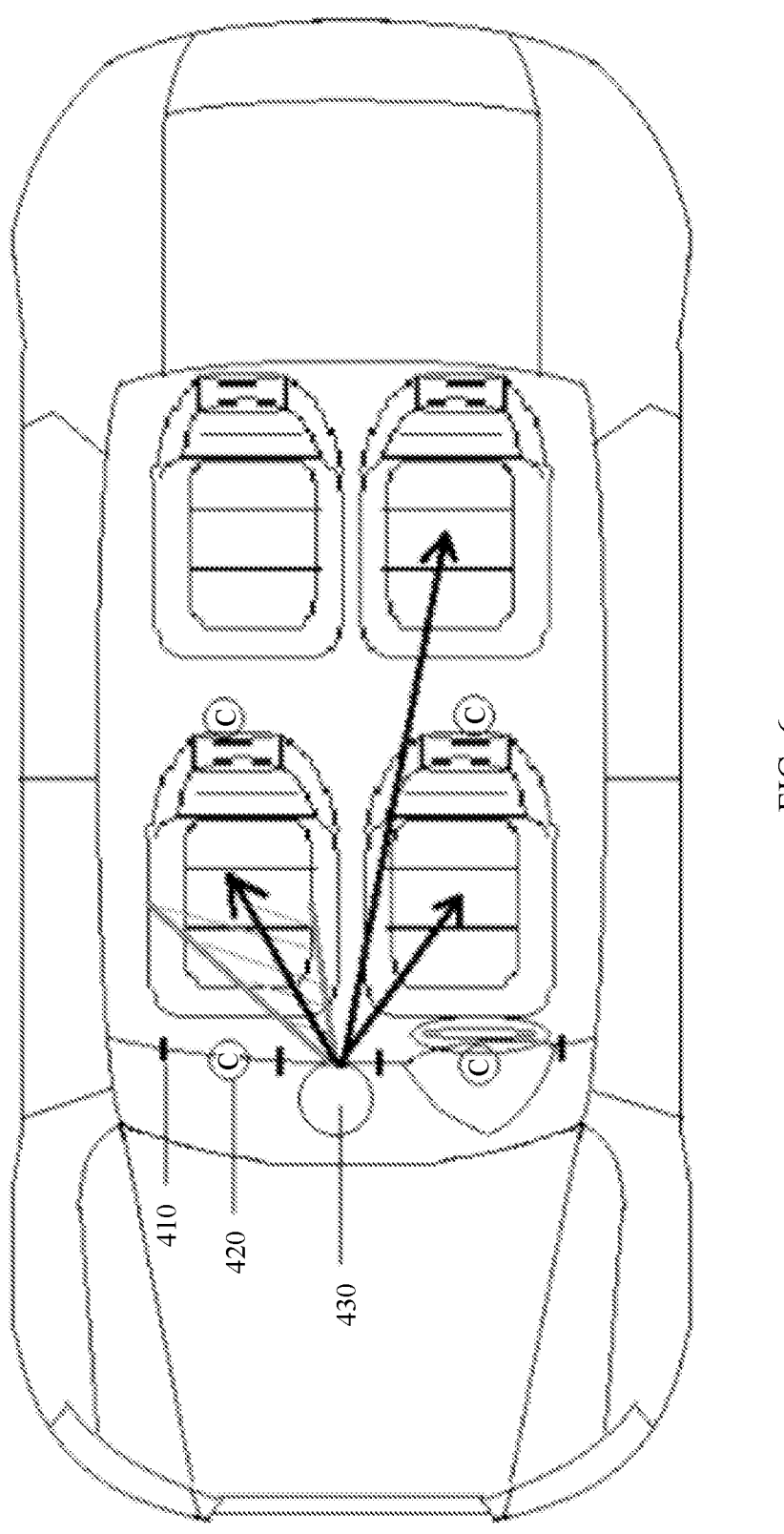
FIG. 6 is a schematic diagram of a structure of an in-vehicle hardware configuration according to an embodiment of this application.

The in-vehicle microphone may be one microphone, or may be a plurality of microphones. For example, the plurality of microphones may be a microphone array. The microphone array may be set according to a requirement. For example, the microphone array may be a uniform circular array or a uniform linear array. FIG. 6 is a schematic diagram of a structure of an in-vehicle hardware configuration. A microphone array in FIG. 6 includes four microphones 410, which are located on a bridge in front of a cockpit and arranged linearly.

S320: When a first voice command is recognized from the sound signal, determine a first user who sends the first voice command.

Specifically, voice recognition may be performed on the sound signal, to determine whether the sound signal includes the first voice command. When the sound signal includes the first voice command, the first user who sends the first voice command is determined. For example, the voice recognition may be performed by the voice recognition module 221 shown in FIG. 4.

For example, the first voice command may be a wakeup word, and the wakeup word may be used to wake up a voice assistant, to activate a subsequent processing procedure.

There may be a plurality of methods of determining the first user who sends the first voice command. The manner of determining the first user is not limited in this embodiment of this application.

Optionally, voiceprint feature matching may be performed on the first voice command, to recognize the first user who sends the first voice command.

Specifically, voiceprint recognition may be performed on the first voice command based on a mapping relationship between a user and a voiceprint feature of the user, to determine the first user who sends the first voice command. In this way, a user who needs to interact can be recognized based on the voiceprint feature, so that positioning accuracy is improved.

For example, the mapping relationship between a user and a voiceprint feature of the user is stored in the database 230, different voiceprint features may correspond to different users, and the voiceprint feature may be used to indicate the user. The voiceprint recognition is performed by using the voiceprint recognition module 223 in FIG. 4. The extracted feature data of a voiceprint corresponding to the first voice command is searched and matched with a feature template (voiceprint feature) stored in the database 230, to obtain a first voiceprint feature that matches the feature template (voiceprint feature), that is, the first user is determined. The first voiceprint feature is voiceprint information of the first user.

If a voiceprint feature corresponding to the first voice command cannot be recognized, that is, a corresponding user cannot be matched in the database, voiceprint information of the user may not be recorded. For example, the user may take the vehicle for the first time. In this case, the user may be reminded to supplement the voiceprint feature and update information in the database.

Alternatively, the first user corresponding to the first voice command may be determined based on a mapping relationship between a user and a voice command. The mapping relationship between a user and a voice command may be stored in the database 230.

For example, different voice commands may be preset for different users, and the voice commands are bound to the users, that is, mapping relationships are established. For example, the mapping relationship is stored as a data pair in the database 230.

For example, a mapping relationship is established between a user A and a voice command "turn on a speaker of A", and a mapping relationship is established between a user B and a voice command "turn on a speaker of B". If the first voice command is "turn on a speaker of A", it is determined that the first user who sends the first voice command is the user A.

S330: Determine an in-vehicle location of the first user based on a mapping relationship between an in-vehicle user and an in-vehicle location.

There may be a plurality of methods of obtaining the mapping relationship between an in-vehicle user and an in-vehicle location. For example, the mapping relationship between an in-vehicle user and an in-vehicle location may be prestored, may be obtained from other devices such as a cloud server, or may be updated in real time. The method for obtaining the mapping relationship between an in-vehicle user and an in-vehicle location is not limited in this embodiment of this application.

For example, the in-vehicle location may be represented by an angle range. Alternatively, the in-vehicle location may be represented by an angle value.

For example, there may be a plurality of in-vehicle areas, and the in-vehicle location may be represented by the in-vehicle area. For example, the in-vehicle area may be an in-vehicle seat, that is, an in-vehicle location is indicated by the in-vehicle seat. In this way, options of the in-vehicle location can be reduced, a calculation amount can be reduced, and a processing speed can be improved.

Alternatively, the in-vehicle location may be a specific in-vehicle location. In this way, even if the user is not seated on a seat, for example, the user is seated between two seats or the user stands on an aisle in a vehicle, an accurate location of the user can be obtained.

For example, the mapping relationship between an in-vehicle user and an in-vehicle location may be stored in the database 230. Step S330 may be performed by the positioning module 222.

There may be a plurality of methods of determining the mapping relationship between an in-vehicle user and an in-vehicle location.

Optionally, the mapping relationship between an in-vehicle user and an in-vehicle location may be determined based on a face image collected by a vehicle-mounted camera. The mapping relationship between a user and an in-vehicle location is determined based on the face image collected by the vehicle-mounted camera, and cooperation of the user is not needed. Therefore, the user may not be disturbed, and user experience can be improved.

Optionally, a user corresponding to the face image may be determined based on a mapping relationship between user information and the face image, and an in-vehicle location of the user is determined based on a location and/or an angle of the vehicle-mounted camera. That is, a mapping relationship is established between the user and the in-vehicle location of the user.

There may be a plurality of methods of obtaining the user information. For example, the user information may be prestored, may be obtained from other devices such as a cloud server, or may be updated in real time. The method for obtaining the user information is not limited in this embodiment of this application.

The user corresponding to the face image is determined based on the mapping relationship between the user information and the face image, that is, facial recognition is performed on the face image, to determine the user corresponding to the face image.

The mapping relationship between the user information and the face image may also be understood to mean a mapping relationship between a user and a facial feature of the user.

For example, the mapping relationship between a user and a facial feature of the user may be stored in the database 230, different facial features may correspond to different users, and the facial features may be used to indicate a user. The facial recognition module 241 in FIG. 4 performs facial recognition, searches the extracted feature data of the face image and matches the feature data with a feature template (facial feature) stored in the database 230, to obtain the matched facial features, that is, the user corresponding to the face image is determined.

If a voiceprint feature corresponding to the face image cannot be recognized, that is, a corresponding user cannot be matched in the database, the facial feature of the user may not be stored. For example, the user may take the vehicle for the first time. In this case, the user may be reminded to supplement the facial feature and update information in the database.

User information is stored in the database, and data can be shared through the database.

For example, the mapping relationship between a user and a voiceprint feature of the user and the mapping relationship between an in-vehicle user and an in-vehicle location are stored in the database, so that a mapping relationship between voiceprint information of the user and an in-vehicle location can be further determined.

For example, the in-vehicle location may be represented by the angle range. Alternatively, the in-vehicle location may be represented by the angle value.

For example, there may be the plurality of in-vehicle areas, and the in-vehicle location may be represented by the in-vehicle area. For example, the in-vehicle area may be the in-vehicle seat, that is, the in-vehicle location is indicated by the in-vehicle seat. A seat range of the user can be determined based on a layout of the cockpit. In this way, the options of the in-vehicle location can be reduced, the calculation amount can be reduced, and the processing speed can be improved.

Alternatively, the in-vehicle location may be the specific in-vehicle location. In this way, even if the user is not seated on a seat, for example, the user is seated between the two seats or the user stands on the aisle in the vehicle, the accurate location of the user can be obtained.

The vehicle-mounted camera may be an in-vehicle camera, or may be an out-vehicle camera. For example, the out-vehicle camera may be installed on a pillar B of the vehicle.

The following uses an example to describe how to determine the in-vehicle location of the user by using the in-vehicle camera.

Manner 1: The in-vehicle location of the user is determined based on a mapping relationship between a location of the in-vehicle camera and an in-vehicle location.

For example, a plurality of cameras are disposed at different in-vehicle locations, and the cameras at different locations are in a one-to-one correspondence with the in-vehicle locations. In this case, a mapping relationship between a location of a camera and an in-vehicle location may also be understood to be mapping relationships between different cameras and in-vehicle locations. Locations of users photographed by different cameras are in-vehicle locations corresponding to the cameras.

Further, as described above, the in-vehicle location may be indicated by the in-vehicle seat. In this case, the mapping relationship between a location of the camera and an in-vehicle location may be a mapping relationship between a location of the camera and an in-vehicle seat. Cameras at different locations are in a one-to-one correspondence with in-vehicle seats, and locations of users photographed by different cameras are in-vehicle seats corresponding to the cameras.

For example, as shown in FIG. 6, for a four-seat vehicle, four cameras 420 may be separately disposed in front of four seats. For front seats, the cameras 420 may be disposed on the bridge; and for rear seats, the cameras 420 may be disposed on the back of the front seats. As shown in FIG. 6, for a user photographed by a camera in front of a front passenger seat, it may be considered that an in-vehicle location of the user is the front passenger seat, namely, a shadow area in FIG. 6. If a center line of a vehicle body is in a direction of 0°, the area may range from −20° to −45°. It should be understood that the angle may be set according to a requirement, and angles corresponding to different cockpit layouts of different vehicle models are also different.

Manner 2: The in-vehicle location of the user is determined based on a mapping relationship between a rotation angle of the in-vehicle camera and an in-vehicle location.

For example, the camera is located on an in-vehicle rearview mirror, and the rotation angle of the camera corresponds to the in-vehicle location. When a center line of a vehicle body is in a direction of 0° and the rotation angle of the camera is 0°, a corresponding in-vehicle location is the middle of a vehicle. In this case, a location of a user photographed by the camera is the middle of the vehicle. When the rotation angle of the camera is an angle A, a corresponding in-vehicle location is an in-vehicle location A. In this case, a location of a user photographed by the camera is the in-vehicle location A.

Further, as described above, the in-vehicle location may be indicated by the in-vehicle seat. In this case, the mapping relationship between a rotation angle of the camera and an in-vehicle location may be a mapping relationship between a rotation angle of the camera and an in-vehicle seat.

For example, for a four-seat vehicle, the camera is located on the in-vehicle rearview mirror. The in-vehicle seat corresponds to the rotation angle of the camera. A user photographed by the camera at different rotation angles is located in the in-vehicle seat corresponding to the rotation angle of the camera. The in-vehicle location is represented by the in-vehicle seat. In this way, the rotation angle may be set according to the seat, so that a calculation amount can be reduced in a positioning process, and a processing speed can be improved.

Because a field-of-view range of the camera is related to the location and/or the angle of the camera, in some embodiments, that the in-vehicle location of the user is determined by using the camera may include: determining, based on a mapping relationship between the field-of-view range of the camera and an in-vehicle location, the in-vehicle location of the user who is photographed by the camera.

For example, if an in-vehicle location corresponding to the field-of-view range of the camera is the middle of the vehicle, for example, a center line of an angle of view is parallel to the vehicle body, the location of the user photographed by the camera is the middle of the vehicle. If an in-vehicle location corresponding to the field-of-view range of the camera is the location A, the location of the user photographed by the camera is the location A.

Optionally, the user corresponding to the face image is determined based on the mapping relationship between a user and a facial feature of the user, and the in-vehicle location of the user is determined based on a relative location of the user in a lens of the vehicle-mounted camera.

Optionally, the in-vehicle location may be indicated by the in-vehicle seat. In this way, the relative location in the lens may be mapped to the in-vehicle seat, so that a calculation amount can be reduced in a positioning process, and a processing speed can be improved.

For example, the vehicle-mounted camera is located on the in-vehicle rearview mirror, and all in-vehicle users may be placed in a viewfinder frame during one photographing. The user corresponding to the face image and the relative location of the user in the lens are determined through facial recognition, and the in-vehicle location corresponding to the user is determined based on the relative location.

For another example, the vehicle-mounted camera is located on the pillar B outside the vehicle, and vehicle-mounted cameras may be separately disposed on pillars B on two sides. For a face image collected by a camera on a left pillar B, a user corresponding to the face image and a relative location of the user in a lens are determined through facial recognition. For example, if the relative location of the user in the lens is on the right side, the user gets on the vehicle from a front door on the left side of the vehicle, and an in-vehicle location corresponding to the user may be a driver's seat.

It should be understood that the foregoing is merely an example. There may be one or more cameras, and a location of a camera, a quantity of cameras, and the like may be set according to a requirement.

For example, the mapping relationship between an in-vehicle user and an in-vehicle location may be stored in the real-time information database 232. The real-time information database may be a database established after the user takes the vehicle.

That the in-vehicle location of the user is determined by using the in-vehicle camera includes: for example, obtaining the face image photographed by the camera; determining the user corresponding to the face image based on the mapping relationship between a user and a facial feature of the user; determining the in-vehicle location of the user based on the location and/or the angle of the vehicle-mounted camera; obtaining the mapping relationship between an in-vehicle user and an in-vehicle location; obtaining the voiceprint feature of the user from the database 230; establishing the mapping relationship between a voiceprint feature of the user and an in-vehicle location; storing the mapping relationship between a voiceprint feature of the user and an in-vehicle location in the real-time information database 232; and then, performing the step S310 to the step S330. In this way, the mapping relationship between a user and an in-vehicle location may be searched in the real-time information database. This avoids a case in which the mapping relationship between an in-vehicle user and an in-vehicle location needs to be re-determined each time the user is located. In addition, a quantity of users in the real-time information database is less than or equal to a quantity of users in the database. The mapping relationship is searched in the real-time information database, so that a search range can be reduced and a processing speed can be improved.

For example, the mapping relationship between an in-vehicle user and an in-vehicle location may be updated in real time, or may be updated periodically. For a specific method for updating the mapping relationship between an in-vehicle user and an in-vehicle location or updating the real-time information database, refer to the following method 600.

For example, the mapping relationship between an in-vehicle user and an in-vehicle location may be established in real time.

That the mapping relationship between an in-vehicle user and an in-vehicle location may be established in real time includes: for example, performing the step S310 and the step S320, to determine the first user; obtaining the face image photographed by the camera; determining, based on the mapping relationship between a user and a facial feature of the user, the user corresponding to the face image; and when the user is the first user, determining the in-vehicle location of the user based on the location and/or the angle of the vehicle-mounted camera, that is, establishing the mapping relationship between the first user and an in-vehicle location of the first user, to determine the in-vehicle location of the first user. In this way, the mapping relationship between an in-vehicle user and an in-vehicle location may be established only when the in-vehicle user needs to be located. This avoids unnecessary calculation. In addition, the mapping relationship between the first user and the location of the first user may be established only for the first user, so that a calculation amount is reduced.

It should be understood that the foregoing manner of determining the mapping relationship between an in-vehicle user and an in-vehicle location is merely an example. The manner of determining the mapping relationship between an in-vehicle user and an in-vehicle location is not limited in this embodiment of this application.

For example, fingerprint collectors may be disposed at different in-vehicle locations. A fingerprint is collected by the fingerprint collector, and a user corresponding to the fingerprint collected by the fingerprint collector is determined based on a mapping relationship between a user and a fingerprint feature of the user. Because different fingerprint collectors correspond to different in-vehicle locations, a mapping relationship may be established between the user and the in-vehicle location. For example, a fingerprint collector A corresponds to an in-vehicle location A. The fingerprint collector A collects a fingerprint A, determines, through fingerprint recognition, that the fingerprint A corresponds to the user A, and further establishes a mapping relationship between the user A and the in-vehicle location A.

Optionally, the mapping relationship between an in-vehicle user and an in-vehicle location may be updated periodically.

Because a user in a cockpit may change a seat or get on/off a vehicle, the mapping relationship between an in-vehicle user and an in-vehicle location is updated periodically, so that accuracy of user positioning can be improved.

With reference to the first aspect, in some implementations of the first aspect, that the mapping relationship between an in-vehicle user and an in-vehicle location is updated periodically includes:

determining, based on the mapping relationship between an in-vehicle user and an in-vehicle location, a user corresponding to a current in-vehicle location; obtaining a current face image collected by the vehicle-mounted camera; determining, based on the mapping relationship between a user and a facial feature of the user, a current user corresponding to the current face image; and when the user corresponding to the current in-vehicle location is not the current user, updating the mapping relationship between an in-vehicle user and an in-vehicle location.

For example, the updating step includes: determining, based on the mapping relationship between an in-vehicle user and an in-vehicle location, that there is no user at the current in-vehicle location; obtaining the current face image collected by the vehicle-mounted camera; determining, based on the mapping relationship between a user and a facial feature of the user, the current user corresponding to the current face image; establishing a mapping relationship between the current user and the current in-vehicle location; and updating the mapping relationship between an in-vehicle user and an in-vehicle location.

For another example, the updating step includes: determining, based on the mapping relationship between an in-vehicle user and an in-vehicle location, that the user corresponding to the current in-vehicle location is the user A; obtaining the current face image collected by the vehicle-mounted camera; determining, based on the mapping relationship between a user and a facial feature of the user, that the current user corresponding to the current face image is the user B; and when the user A and the user B are not a same person, establishing a mapping relationship between the user B and the current in-vehicle location, and updating the mapping relationship between an in-vehicle user and an in-vehicle location.

Optionally, the method 300 further includes step S340 and the step S350.

S340: Perform sound source positioning based on the sound signal, to obtain at least one sound source location.

Specifically, the sound source positioning may be performed on the sound signal by using a sound source positioning method based on a microphone array. For example, the sound source positioning method may be a MUSIC algorithm. The microphone array may be set according to a requirement. For example, the microphone array may be the uniform circular array or the uniform linear array. For example, FIG. 6 shows a microphone array. The microphone array includes four microphones, which are located on the bridge in front of the cockpit and arranged linearly.

The MUSIC algorithm may be used to obtain a distribution graph of signal energy at different angles. A peak value is an incoming direction of a signal. The at least one sound source location may be obtained according to the graph. For example, as shown in FIG. 2, when users at 0° and 60° speak at the same time, two peak values are generated on the graph.

It should be understood that this is merely an example herein. A specific sound source positioning manner is not limited in this embodiment of this application. Other methods that can implement sound source positioning may also be used in the step S340.

S350: Correct the in-vehicle location of the first user based on the in-vehicle location of the first user and the at least one sound source location.

If the in-vehicle location of the first user cannot be determined in the step S330, for example, the first user cannot be recognized, the in-vehicle location of the first user in this step may be a default value, for example, −90° to 90°. In other words, the in-vehicle location of the first user is directly determined based on the at least one sound source location.

Optionally, a sound source location that is in the at least one sound source location and that is closest to the in-vehicle location of the first user is determined as a corrected in-vehicle location of the first user.

Figure 7:
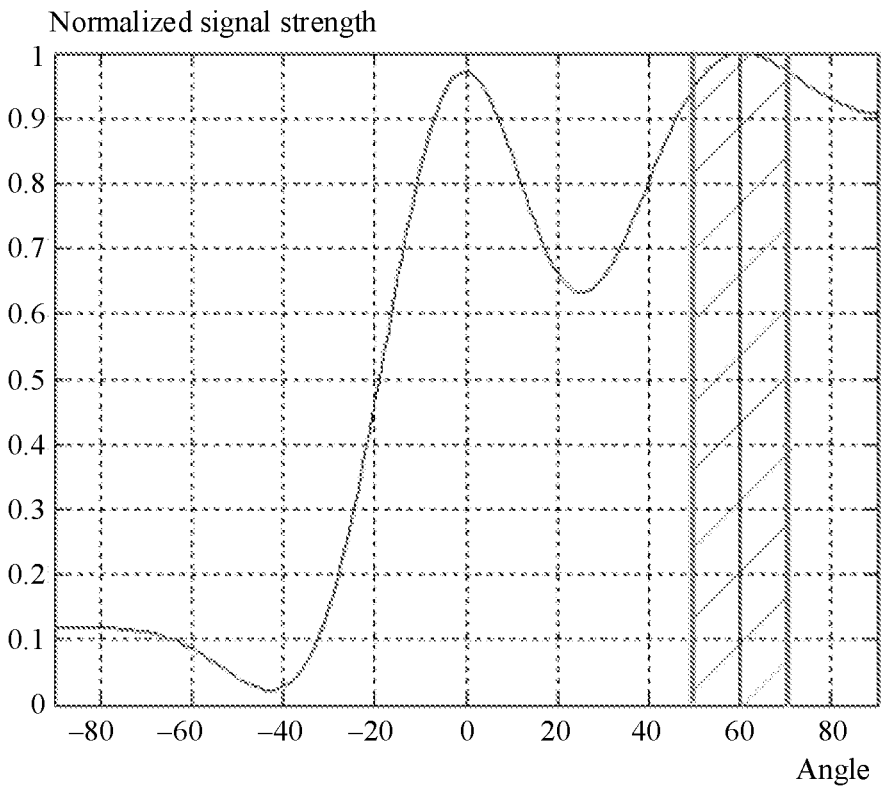
FIG. 7 is a schematic diagram of correcting an in-vehicle location of a first user according to an embodiment of this application.

For example, if the in-vehicle location of the first user obtained in the step S330 is an angle range, a sound source location that is in the at least one sound source location and that falls within the angle range is used as the corrected in-vehicle location of the first user. For example, FIG. 7 is a schematic diagram of correcting the in-vehicle location of the first user. The in-vehicle location of the first user determined in the step S330 ranges from 50° to 70°. Sound source positioning is performed on the sound signal to obtain an energy graph of the sound source location. The energy graph is superimposed with an angle range of the first user. There is only one peak value at a location of 60° in the range of 50° to 70°. A peak value at a location of 0° is excluded, and 60° is used as a final in-vehicle location of the first user. That is, users at 0° and 60° are speaking, and a user at 60° location needs to perform voice interaction. Therefore, impact of a user at 0° location on voice interaction is excluded. If there are a plurality of sound source locations within the angle range, an intermediate value of the angle range may be used as the corrected in-vehicle location of the first user. For example, if the angle range is 20° to 40°, and there are a plurality of sound source locations in the range, 30° is used as the corrected in-vehicle location of the first user. When there are the plurality of sound source locations, a user who needs to interact cannot be determined only through sound source positioning. Compared with a solution of determining a location of a user only through sound source positioning, this solution can improve accuracy of locating the user, and reduce impact on voice interaction in a noisy environment, for example, when a plurality of users speak at the same time.

For example, if the in-vehicle location of the first user cannot be determined in the step S330, for example, the in-vehicle location of the first user is in a range of −90° to 90°, a sound source location in the range is used as the corrected in-vehicle location of the first user. If there are a plurality of sound source locations in the range, 0° may be used as the corrected in-vehicle location of the first user.

For example, if the in-vehicle location of the first user obtained in the step S330 is an angle value, a sound source location that is in the at least one sound source location and that is closest to the angle value is used as the corrected in-vehicle location of the first user.

Through sound source positioning, accuracy of the in-vehicle location of the first user can be further improved, and a user who needs to interact can be accurately located in a noisy in-vehicle environment. In other words, with reference to collected acoustic and visual information, precision and a use range of sound source positioning can be improved.

According to the solution in this embodiment of this application, a user who needs to interact is determined according to a voice command, and then an in-vehicle location of the user who needs to interact is determined based on the mapping relationship between an in-vehicle user and an in-vehicle location. Even if a plurality of users speak at the same time, the user who needs to interact can be located. This helps implement one-to-one interaction and improve user experience.

The in-vehicle user positioning method in this embodiment of this application may be applied to a plurality of in-vehicle interaction scenarios, and specifically, may be applied to a scenario in which a user needs to be located.

Currently, an expression form and an interaction mode are relatively simple for in-vehicle voice assistants, most of which are interactive only through voice. The expression form and the interaction mode are mainly two-dimensional animation images.

3D holographic projection records and reproduces real three-dimensional images of objects by using interference and diffraction principles. It is a 3D technology that allows viewers to see stereoscopic virtual characters without wearing glasses. A basic principle of the 3D holographic projection is as follows: light wave information of the object is recorded by using an interference principle in a photographing process, and light wave information of the object is reproduced by using a diffraction principle in an imaging process, to reproduce a real three-dimensional image of the object. The 3D holographic projection may also include a holographic-like projection technology that implements a 3D effect by using methods such as Pepper's ghost and edge blanking. However, in terms of a current technology in a cockpit, a laser projection system and an air projection system cannot maintain a projection effect for a long time, and a projection frame for the holographic-like projection technology is relatively fixed. Therefore, better interaction experience cannot be implemented.

A visual image of a voice assistant is displayed through three-dimensional projection, so that entertainment can be improved, and user experience can be significantly improved. When a user needs to interact, an image of the voice assistant can provide one-to-one interaction experience for the user who needs to interact.

Figure 8:
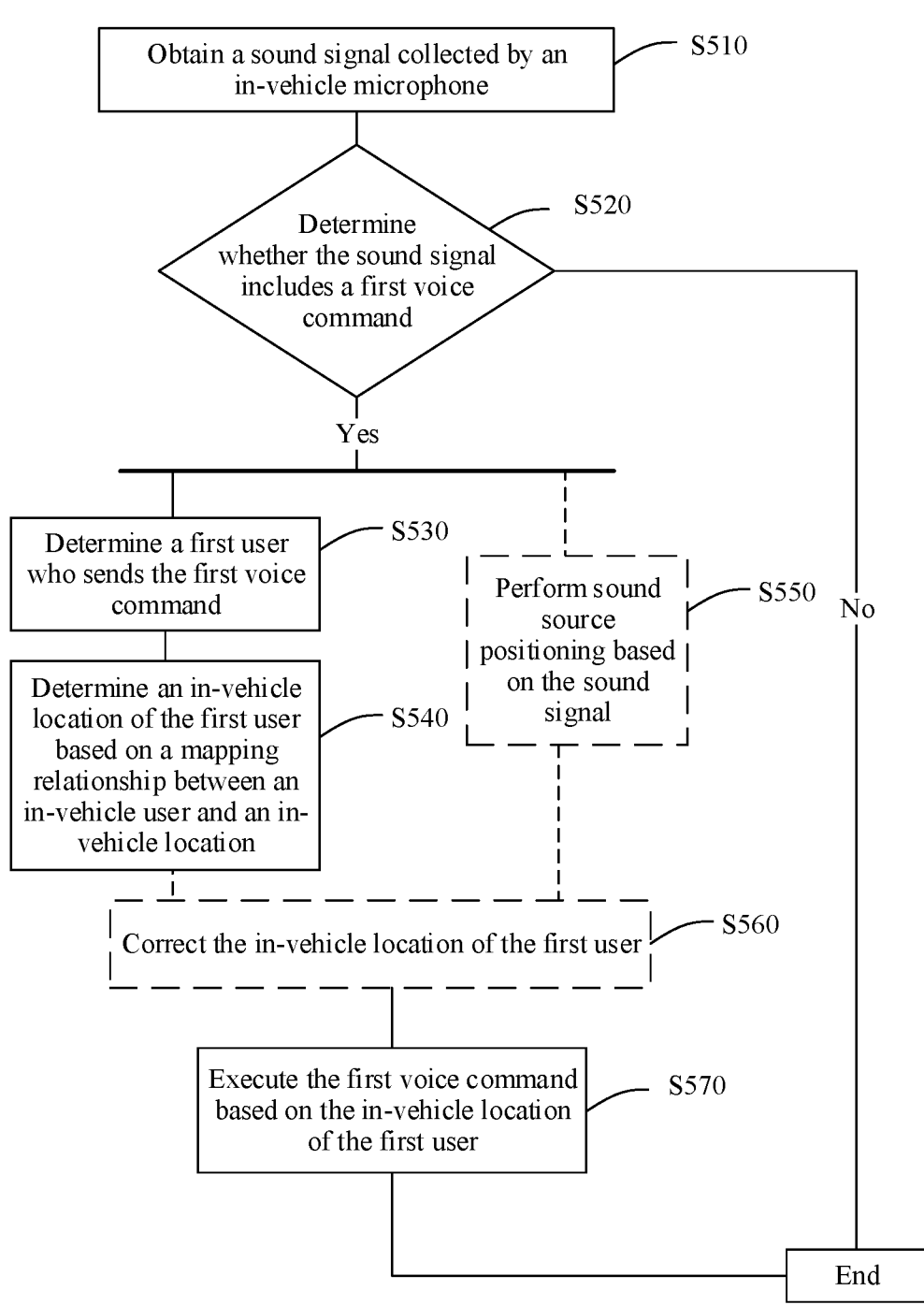
FIG. 8 is a schematic flowchart of an in-vehicle interaction method according to an embodiment of this application.

FIG. 8 shows an in-vehicle interaction method 500 according to an embodiment of this application. An in-vehicle user positioning method involved in the in-vehicle interaction method may be implemented by using the in-vehicle user positioning method 300. For a specific implementation, refer to the foregoing method 300. To avoid unnecessary repetition, repeated descriptions are properly omitted below when the method 500 is described. The method 500 includes step S510 to step S570.

The method 500 may be performed by the system in FIG. 4. The voice assistant component 210 in FIG. 4 may further include a projector component. Specifically, the projector component includes a projection frame and the steering motor 212. The projection frame may be configured to display a three-dimensional image of a voice assistant.

Figure 9:
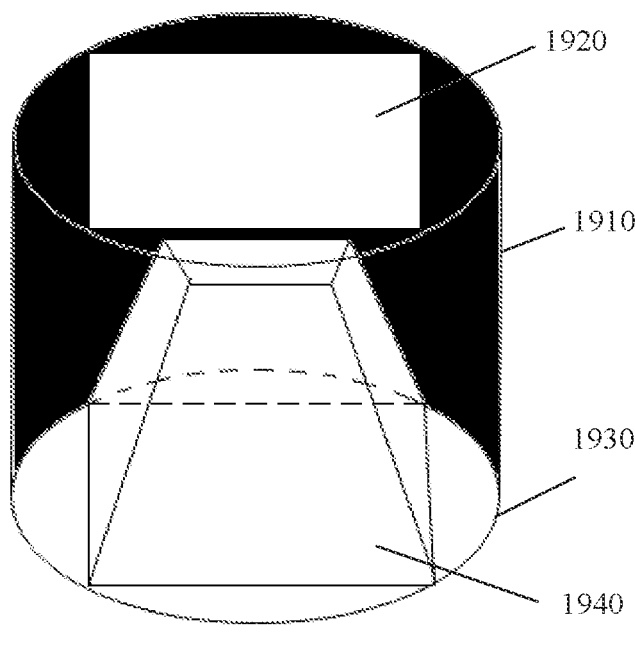
FIG. 9 is a schematic diagram of a structure of a projection frame according to an embodiment of this application.

FIG. 9 is a schematic diagram of a structure of the projection frame according to an embodiment of this application. The projection frame in FIG. 9 mainly includes four parts: a frame body 1910, a display 1920, a rotating base 1930, and a projection structure 1940.

The frame body 1910 is cylindrical tempered glass, and the rear and top of the frame body 1910 are covered with light shielding coating. In this way, a visual effect is not weakened due to diffuse reflection of sunlight.

The display 1920 is configured to perform projection. A shape of the display 1920 may be set according to a requirement. For example, the display 1920 may be a square display. The display 1920 is located on the top of the frame body, for example, may be embedded on an inner side of the top of a cylinder.

The rotating base 1930 is connected to a rotating motor in a cockpit, and is configured to drive the projection structure 1940 and the display 1920 to rotate. The frame body 1910 remains stationary during rotation.

The projection structure 1940 is fixed onto the rotating base 1930, and is relatively fixed to a position of the display 1920. In other words, the projection structure 1940 and the display 1920 remain relatively stationary in a rotation process. The projection structure 1940 includes four pieces of isosceles trapezoidal tempered glass to which a holographic film is attached.

The rotary motor may be configured to control rotation of the projection frame. For example, the rotary motor may be a stepper motor. The rotary motor may receive a result, for example, location information, returned by the positioning module 222, and perform a corresponding steering operation based on the result, so that a three-dimensional image of the voice assistant faces a user who needs to interact.

The projection frame may be disposed on a center console and located on a center line in the cockpit. For example, an in-vehicle microphone 410, the camera 420, and a projection frame 430 may be disposed as shown in FIG. 6. It should be understood that FIG. 6 is merely an example. Locations of the in-vehicle microphone, the camera, and the projection frame may be set according to a requirement.

For ease of describing the method 500, the center line of the cockpit may be set to 0°, and an angle range of sound source positioning is between −90° and 90°.

The following describes the step S510 to the step S570.

S510: Obtain a sound signal collected by a microphone.

S520: Determine whether the sound signal includes a first voice command. If the sound signal does not include the first voice command, end the procedure and continue monitoring; or if the sound signal includes the first voice command, perform the step S530 and step S550. The step S530 and step S550 may be performed asynchronously.

Specifically, voice recognition may be performed on sound signal, to determine whether the sound signal includes the first voice command.

For example, the first voice command may be a wakeup word.

S530: Determine a first user who sends the first voice command.

For example, voiceprint recognition is performed on the first voice command based on a mapping relationship between a user and a voiceprint feature of the user, to determine the first user who sends the first voice command. For a specific description, refer to the step S320 in the foregoing method 300.

S540: Determine an in-vehicle location of the first user based on a mapping relationship between an in-vehicle user and an in-vehicle location.

For example, a mapping relationship between a voiceprint feature of a user and an in-vehicle seat is stored in the real-time information database. A corresponding in-vehicle seat is determined through comparison of a voiceprint feature of the first voice command in the real-time information database.

For example, a mapping relationship between a user and an in-vehicle seat is determined based on a face image collected by a vehicle-mounted camera, and then a voiceprint feature of a user is determined based on the mapping relationship between a user and a voiceprint feature of the user, to obtain a mapping relationship between voiceprint information of the user and an in-vehicle seat, and store the mapping relationship in the real-time information database. For a specific description, refer to the step S330 in the foregoing method 300.

For example, the real-time information database may be updated in real time, or may be updated periodically. For a detailed method for updating the real-time information database, refer to the following method 600.

For example, the in-vehicle location may be an angle range. For example, when a user seat is a front passenger seat, the angle range may be −20° to −45°. It should be understood that the angle range herein is merely an example. For different vehicle models and different cockpit layouts, angle ranges corresponding to in-vehicle seats may be different.

S550: Perform sound source positioning based on the sound signal.

For example, sound source positioning may be performed on the sound signal by using a MUSIC algorithm, to obtain at least one sound source location. For a specific description, refer to the step S340 in the foregoing method 300.

S560: Correct the in-vehicle location of the first user.

For example, the in-vehicle location of the first user is corrected based on the angle range determined in the step S540 and the at least one sound source location determined in the step S550.

For example, a sound source location within the angle range determined in the step S540 may be used as a corrected in-vehicle location of the first user. For a specific description, refer to the step S350 in the foregoing method 300.

S570: Execute the first voice command based on the in-vehicle location of the first user.

Optionally, a location of a projection interface is controlled based on the in-vehicle location of the first user.

The projection interface may be configured to display a projected image.

For example, the location of the projection interface may be controlled according to a rotation angle of the projector component.

Specifically, in-vehicle location information of the first user may be used to control steering of the projector component. The corrected in-vehicle location of the first user is returned to the steering motor 212 in the voice assistant component, and the projection frame is controlled to rotate.

It should be understood that the step S550 and the step S560 are optional steps. If the method 500 does not include the step S550 and the step S560, in the step S570, the in-vehicle location of the first user obtained in the step S540 is returned to the projector component.

It should be noted that the first voice command is not necessarily a command for the location of the projection interface, that is, the first voice command may be any voice command. For example, the first voice command may be adjusting a temperature of an air conditioner. In this case, executing the first voice command includes adjusting the temperature of the air conditioner and controlling the location of the projection interface.

As described above, the in-vehicle user positioning method in this embodiment of this application may be applied to a plurality of in-vehicle interaction scenarios, for example, scenarios in which an in-vehicle user needs to be located, such as music playing, air conditioner control, seat heating, and seat adjustment. Different voice commands can be used to implement interaction in different interaction scenarios. The following uses an example to describe the in-vehicle interaction method 500.

Optionally, executing the first voice command based on the in-vehicle location of the first user includes: controlling a speaker corresponding to the in-vehicle location of the first user.

For example, the in-vehicle interaction scenario may be music playing. For example, the first voice command is playing music. The step S570 includes: controlling a speaker corresponding to the in-vehicle location of the first user, for example, turning on the speaker, and playing corresponding music.

Optionally, the executing the first voice command based on the in-vehicle location of the first user includes: controlling an air conditioner corresponding to the in-vehicle location of the first user.

For example, the in-vehicle interaction scenario may be air conditioner control. For example, the first voice command is turning on the air conditioner. The step S570 includes: turning on the air conditioner corresponding to the in-vehicle location of the first user.

It should be understood that the foregoing is merely an application example of the in-vehicle interaction method. The in-vehicle interaction method in this embodiment of this application may be further applied to another scenario in which a user needs to be located.

In this embodiment of this application, a user who needs to interact is determined according to a voice command, and then an in-vehicle location of the user who needs to interact is determined based on the mapping relationship between an in-vehicle user and an in-vehicle location. Even if a plurality of users speak at the same time, the user who needs to interact can be located.

In addition, positioning accuracy can be further improved by using a sound source positioning algorithm, and user experience can be improved.

In addition, a projected image is displayed by using a projector component, for example, a visual image of a voice assistant is displayed, and a rotation angle of the projector component is adjusted based on an in-vehicle location, so that the projected image can face a user who needs to interact, and one-to-one interaction experience is provided for the user.

Figure 10:
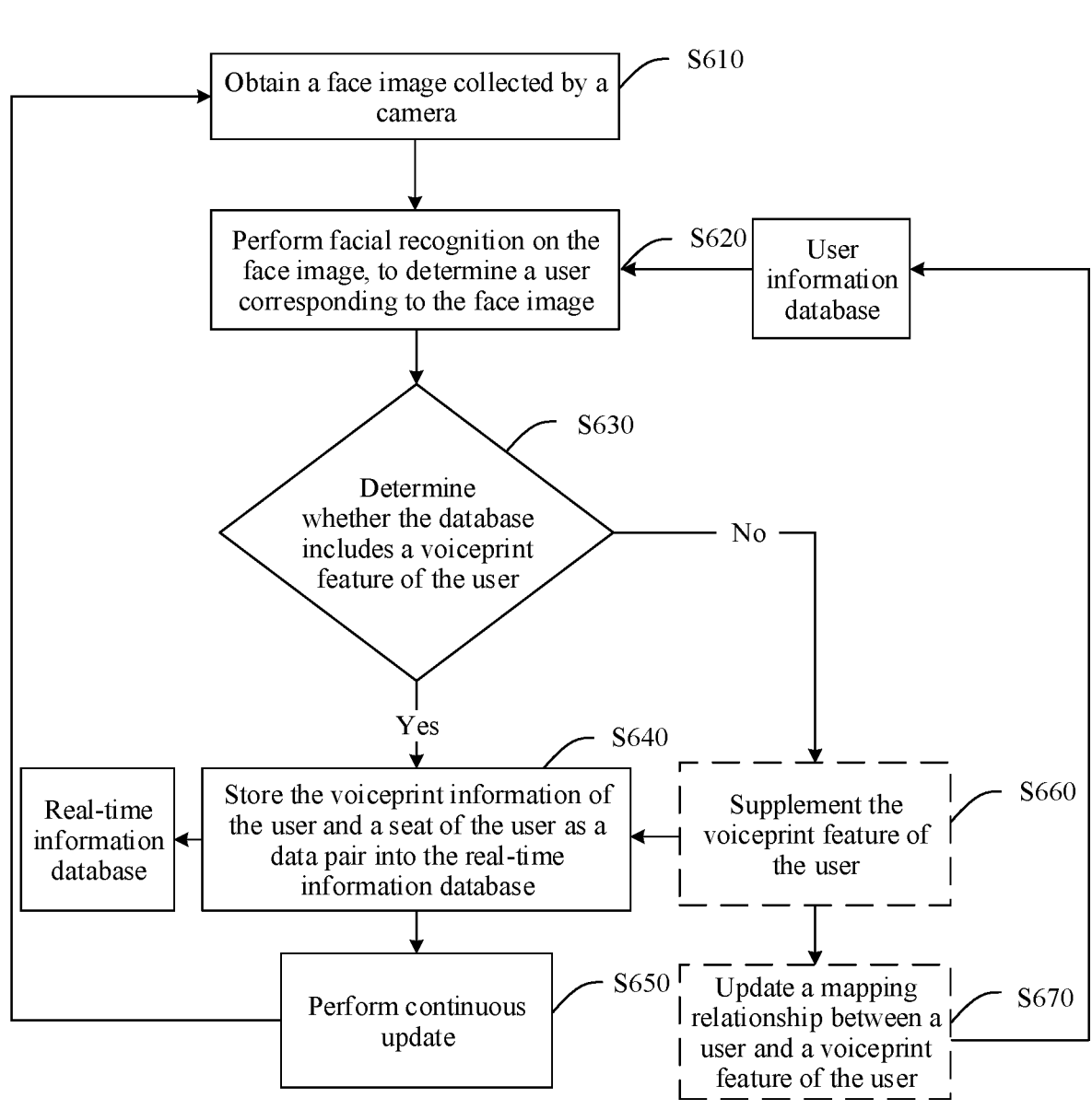
FIG. 10 is a schematic flowchart of a method for updating an in-vehicle location of a user according to an embodiment of this application.

FIG. 10 is a schematic flowchart of a method 600 for updating a real-time information database. As described above, the in-vehicle area may be used to indicate the in-vehicle location. For ease of understanding and description, in the method 600, the in-vehicle area is divided based on the in-vehicle seat. In this case, the method for updating a real-time information database may also be understood as a method for updating in-vehicle seat information. The method 600 includes step S610 to step S670. The following describes the step S610 to the step S670 in detail.

S610: Obtain a face image collected by a camera.

S620: Perform facial recognition on the face image, to determine a user corresponding to the face image.

Specifically, the user corresponding to the face image may be determined based on the mapping relationship between a user and a facial feature of the user.

For example, the mapping relationship between a user and a facial feature of the user may be stored in the database. Feature extraction is performed on the face image, and the extracted feature data is matched with a facial feature of the user in the database, to determine whether the user is recognized as a user in the database. If the user is recognized as the user in the database, perform step S630. If the user cannot be recognized as a non-database user, the process ends.

S630: Determine whether the database includes a voiceprint feature of the user. If the database includes the voiceprint information of the user, perform step S640. If the database does not include the voiceprint information of the user, the process ends.

Optionally, the method 600 further includes step S660. In this case, if the database does not include the voiceprint information of the user, perform the step S660.

S640: Store the voiceprint information of the user and a seat of the user as a data pair into the real-time information database.

The seat of the user may be determined by using a camera. For example, FIG. 6 shows four cameras, which respectively correspond to four seats. A camera A corresponds to a seat A, and a user corresponding to a face image photographed by the camera A is located on the seat A. The seat of the user may be distinguished by using a seat number, that is, the step S640 may be: storing the voiceprint information of the user and a seat number of the user as a data pair.

S650: Perform continuous update.

For example, facial recognition is periodically performed again. When the recognized facial feature is inconsistent with a facial feature currently corresponding to the seat, a mapping relationship between a user and an in-vehicle seat may be re-established. Alternatively, it may be understood to mean that a voiceprint feature of the user is searched from the database and a mapping relationship between the voiceprint feature of the user and an in-vehicle seat is established.

For example, the step S610 to the step S640 may be periodically performed. It should be understood that the step S650 is an optional step.

S660: Supplement the voiceprint feature of the user, and perform the step S640.

S670: Update the mapping relationship between a user and a voiceprint feature of the user.

A mapping relationship is established between the supplemented voiceprint feature and the user and is stored in the database. It should be understood that the step S670 is an optional step.

The in-vehicle seat may correspond to different states. In a process of performing the foregoing step S610 to step S670, a state of the in-vehicle seat changes accordingly. It should be understood that in this embodiment of this application, the state of the seat is a state of the seat in the system.

Figure 11:
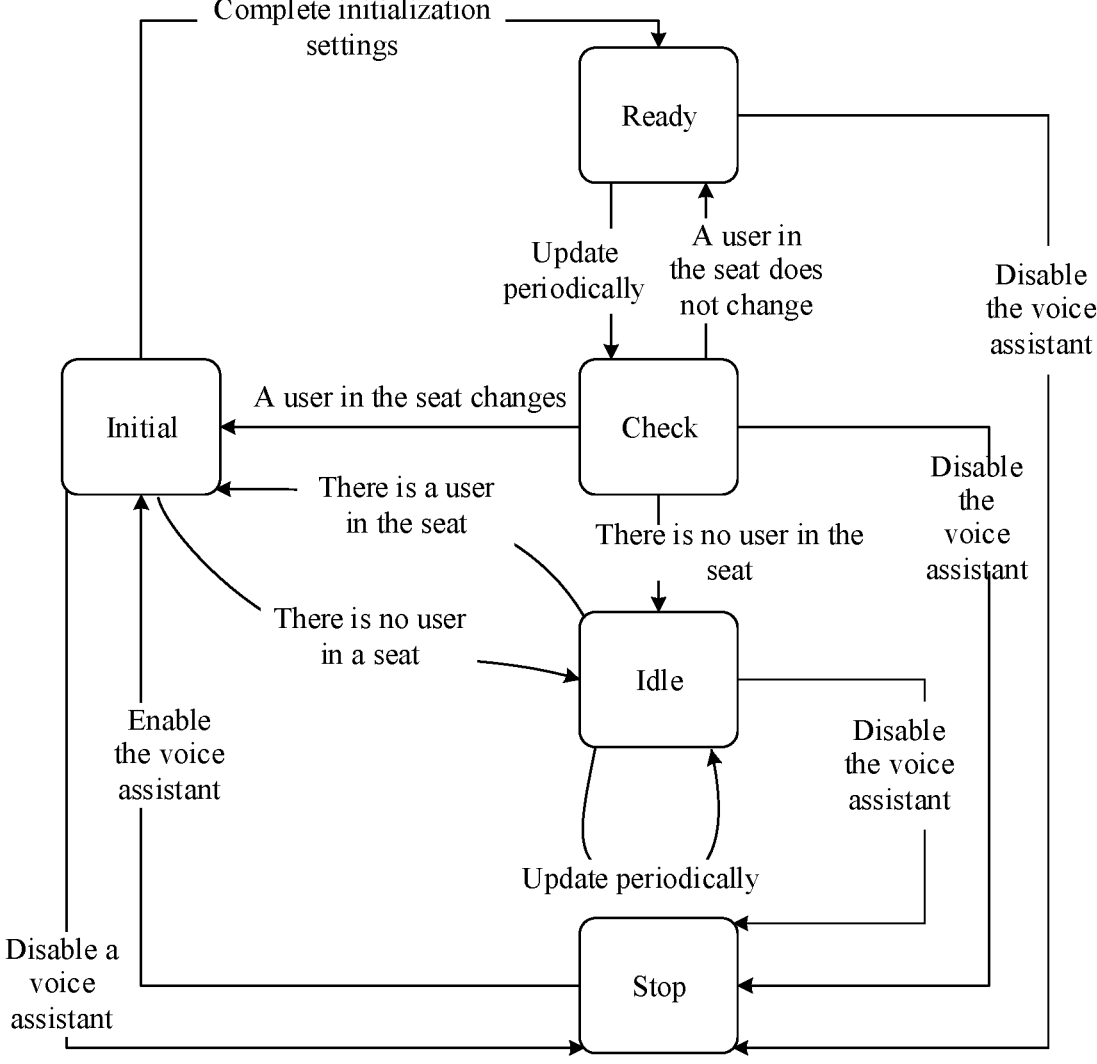
FIG. 11 is a schematic flowchart of state switching of an in-vehicle seat according to an embodiment of this application.

FIG. 11 is a schematic flowchart of a state switching process of an in-vehicle seat.

Initial (Init) state: This state is the initial state. In this state, initialization settings are performed. For example, when the voice assistant is enabled or a user in a seat changes, the seat enters the Init state. In this state, facial recognition is performed on the user, a user identity is confirmed, a voiceprint feature is matched, and a corresponding mapping relationship is stored in the real-time information database for locating an in-vehicle user. For a specific initialization setting process, refer to FIG. 12A and FIG. 12B below. After that, the seat enters a Ready state. If it is detected that there is no user in the seat, the seat enters an Idle state.

Ready (Ready) state: A seat is in an available state, that is, the method in this embodiment of this application may be implemented in this state. If all in-vehicle seats are available, the system is available. Further, the state of the seat may be updated periodically. For example, the seat enters a Check state at a specified interval, for example, 10 s, to check a user.

Check (Check) state: In this state, whether a user in the seat changes is checked. If the user is not changed, return to the Ready state. If the user is changed, enter the Init state.

Alternatively, further, if there is no user in the seat, for example, the user gets off a vehicle or changes a seat, the seat enters the Idle state. For a specific inspection process, refer to FIG. 13 below.

Idle (Idle): There is no user in the seat in this state. Further, periodic update is allowed in this state. For example, whether there is a user in the seat is re-determined at an interval, for example, 10 s. When a passenger appears in the seat, the seat enters the Init state and seat information of the user is updated again.

Stopped (Stop) state: In this state, the voice assistant is disabled. Further, data in the real-time information database may be deleted. In any of the foregoing states, the seat enters this state when power is off or the voice assistant is disabled.

Figure 12A:
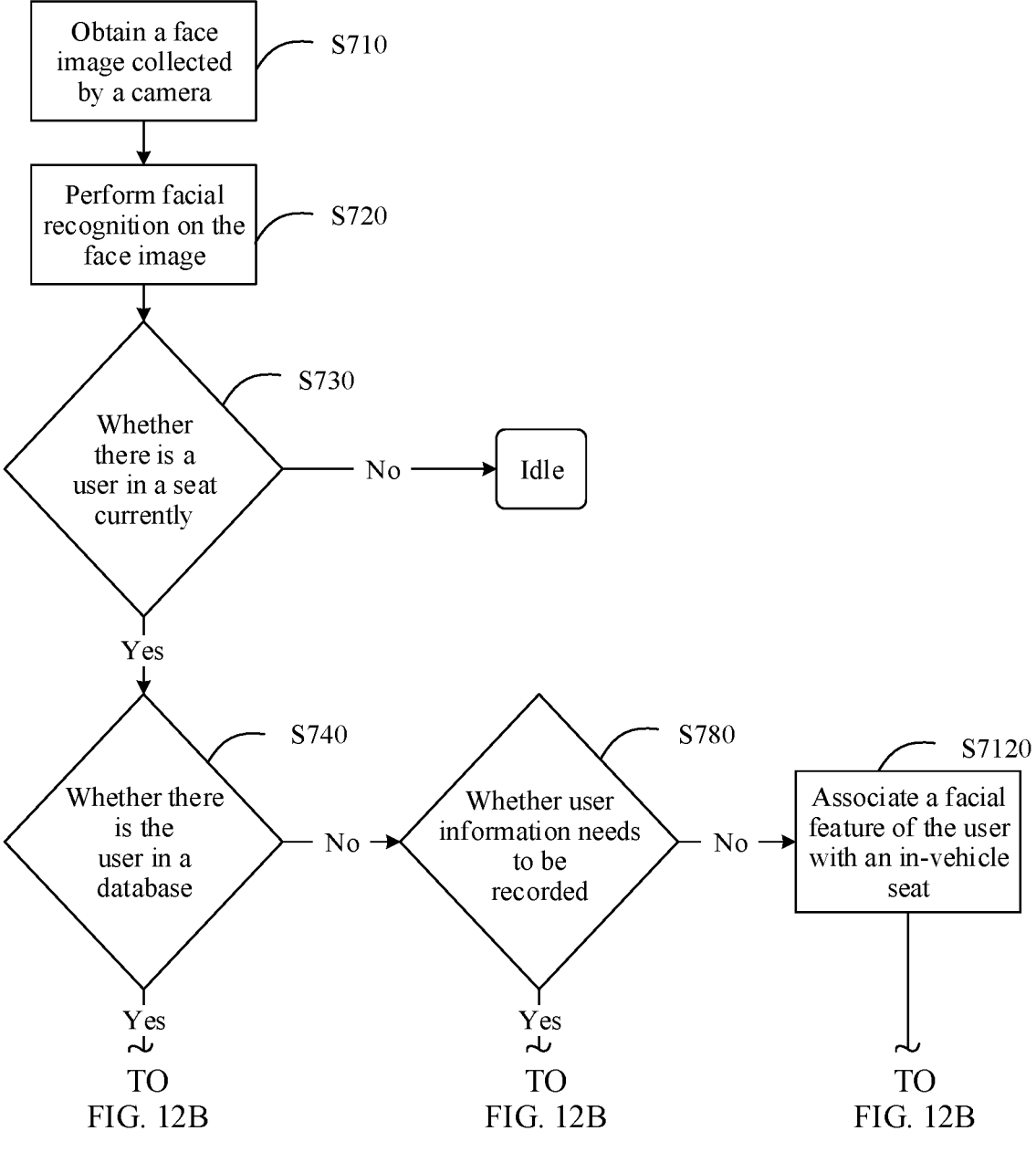
FIG. 12A and FIG. 12B is a schematic flowchart of an initialization process of updating an in-vehicle seat according to an embodiment of this application.
Figure 12B:
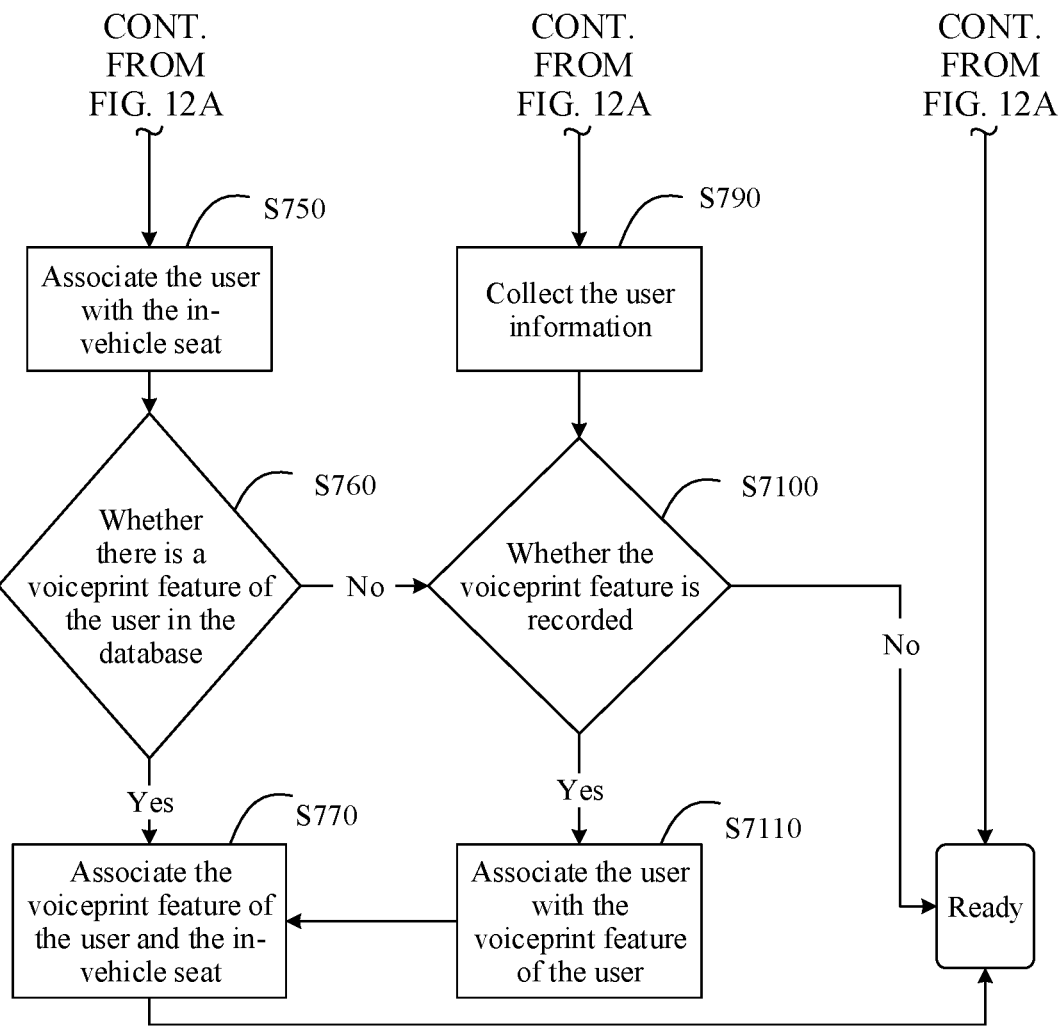

FIG. 12A and FIG. 12B is a schematic flowchart of initialization setting in a process of updating seat information of a user. The initialization setting includes step S710 to step S7120.

S710: Obtain the face image collected by the camera.

S720: Perform facial recognition on the face image.

S730: Determine whether there is a user in the seat currently. If there is a user in the seat currently, perform step S740. If there is no user in the seat currently, the seat enters the Idle state.

S740: Determine whether there is the user in the database.

Determining whether there is the user in the database may also be understood to mean determining whether the user can be recognized through facial recognition. If there is the user in the database, that is, the user is recognized based on a facial recognition result, perform step S750. If there is no user in the database, that is, the user cannot be recognized based on a facial recognition result, perform step S780. The step S780 is an optional step.

S750: Associate the user with the in-vehicle seat. That is, the mapping relationship between a user and an in-vehicle seat is established.

S760: Determine whether there is a voiceprint feature of the user in the database. If there is the voiceprint feature of the user in the database, perform step S770. If there is no voiceprint feature of the user in the database, perform step S7100. The step S7100 is an optional step.

S770: Associate the voiceprint feature of the user with the in-vehicle seat. That is, the mapping relationship between a voiceprint feature of a user and an in-vehicle seat is established. For example, the voiceprint feature and the seat number of the user are saved to the real-time information database as a data pair, and the seat enters the Ready state.

S780: Determine whether user information needs to be recorded.

Specifically, the user may be asked whether to enter the user information. If the user agrees to enter the user information, perform step S790. If the user does not agree to enter the user information, perform step S7120.

S790: Collect the user information, including a facial feature and the like, and store the user information in the database. For example, register and log in to the head unit.

S7100: Determine whether a voiceprint feature needs to be recorded.

Specifically, the user may be asked whether to record the voiceprint information of the user. If the user agrees to record the voiceprint information, perform the step S7110. If the user does not agree to record the voiceprint information, the seat enters the Ready state.

S7110: Associate a user with a voiceprint feature of the user. That is, the mapping relationship between a user and a voiceprint feature of the user is established. For example, the mapping relationship is stored in the database as a data pair. Perform the S770.

S7120: Associate a facial feature of the user with the seat. Then, the seat enters a Ready state. That is, a mapping relationship between a facial feature of the user and an in-vehicle seat is established. For example, the mapping relationship is stored in the real-time information database as a data pair. In this way, the facial feature of the user may be stored, to determine whether a user in the seat changes later.

Figure 13:
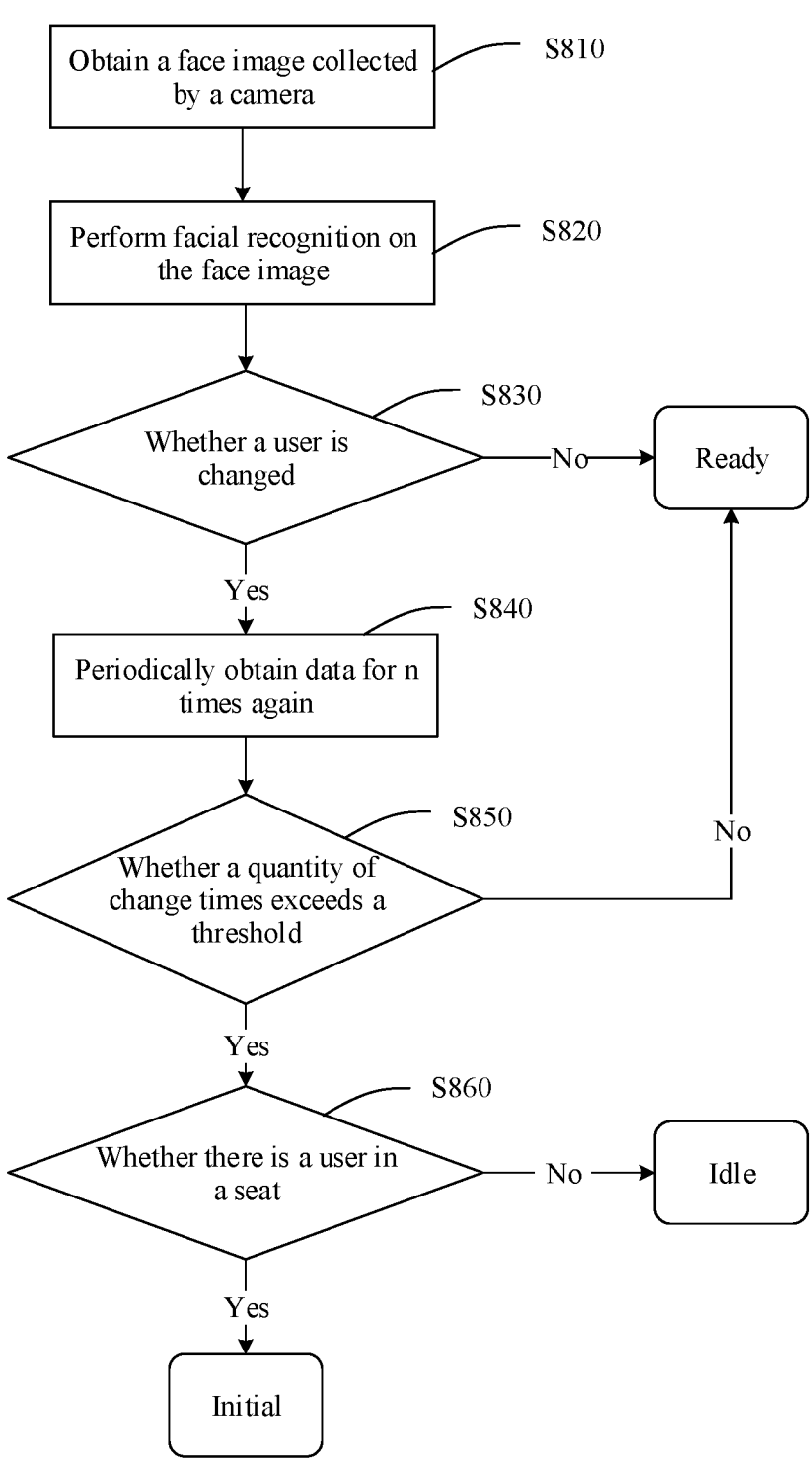
FIG. 13 is a schematic flowchart of a check process of updating an in-vehicle seat according to an embodiment of this application.

FIG. 13 is a schematic flowchart of a seat information update check process. The check process includes step S810 to step S860.

S810: Obtain the face image collected by the camera.

S820: Perform facial recognition on the image.

S830: Determine whether the user is changed.

Specifically, a facial recognition result may be compared with a facial feature corresponding to the seat, to determine whether the user is changed.

If the user is changed, perform step S840. If the user is not changed, the seat enters the Ready state.

S840: Periodically obtain the data for n times again, that is, perform the step S810 to the step S830 again at an interval, to obtain n results.

S850: If a quantity of change times exceeds a threshold, perform step S860; otherwise, the seat enters the Ready state.

It should be noted that the step S850 is merely an example. Alternatively, the step S850 may be: if the n results meet a preset condition, perform step S860. For example, if the n results indicate that the user in the seat changes, perform the step S860. If a result that the user is not changed is included in the result obtained in the step S850, the seat enters the Ready state. In this way, whether the user in the seat changes may be voted, to reduce a possibility of misjudgment.

It should be noted that the step S840 and the step S850 are optional steps. Alternatively, the step S830 may be that if the user is changed, perform step S860.

S860: Determine whether there is a user in the seat currently. If there is the user in the seat, the seat enters the Init state, for example, performs the steps in FIG. 12A and FIG. 12B. It should be noted that in this case, the step S730 may not be performed. If there is no user in the seat, the seat enters the Idle state.

For example, the step S860 may alternatively be performed before the step S830. For example, if there is the user in the seat, the step S830 is performed. In this case, in the step S850, if the quantity of change times exceeds the threshold, the seat enters the Init state. If there is no user in the seat, the seat enters the Idle state.

It should be noted that the foregoing example description is merely intended to help a person skilled in the art understand embodiments of this application, instead of limiting embodiments of this application to the illustrated specific value or specific scenario. A person skilled in the art definitely can make various equivalent modifications or changes based on the examples described above, and such modifications or changes also fall within the scope of embodiments of this application.

The following describes apparatus embodiments in embodiments of this application in detail with reference to the accompanying drawings. It should be understood that the apparatuses described below can perform the methods in the foregoing embodiments of this application. To avoid unnecessary repetition, repeated descriptions are properly omitted when the apparatuses in the embodiments of this application are described below.

Figure 14:
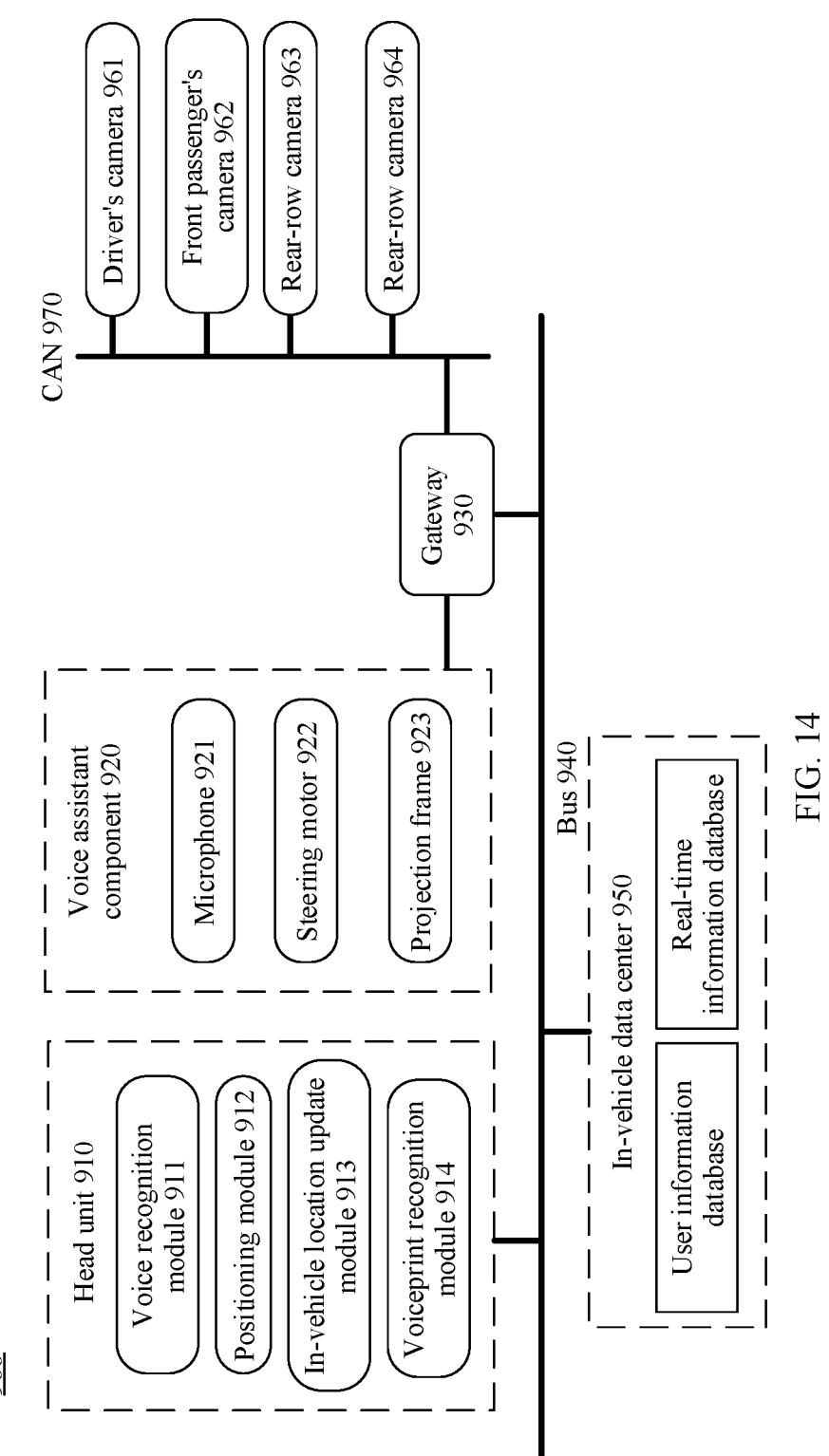
FIG. 14 is a schematic diagram of a structure of an in-vehicle system according to an embodiment of this application.

FIG. 14 is a schematic block diagram of an in-vehicle system according to an embodiment of this application. The in-vehicle system 900 shown in FIG. 14 includes a head unit 910, a voice assistant component 920, a gateway 930, a bus 940, an in-vehicle data center 950, a camera, and a controller area network (controller area network, CAN) 970.

The head unit 910 includes a plurality of calculation modules, and communicates with another device by using the bus 940. Specifically, the head unit 910 includes a voice recognition module 911 and a positioning module 912. Optionally, the head unit further includes an in-vehicle location update module 913. Optionally, the head unit further includes a voiceprint recognition module 914.

The voice recognition module 911 corresponds to the voice recognition module 221 in FIG. 4, and the positioning module 912 corresponds to the positioning module 222 in FIG. 4. The voiceprint recognition module 914 corresponds to the voiceprint recognition module 223 in FIG. 4.

The in-vehicle location update module 913 is configured to update a mapping relationship between an in-vehicle user and an in-vehicle location. For example, the in-vehicle location update module 913 may perform the steps in FIG. 10, FIG. 12A and FIG. 12B, or FIG. 13.

The voice assistant component 920 includes a microphone 921. The microphone 921 may be a microphone array. Optionally, the voice assistant component 920 further includes a steering motor 922 and a projection frame 923. The voice assistant component can be connected to a cockpit through the gateway.

The voice assistant component 920 corresponds to the voice assistant component 210 in FIG. 4.

The in-vehicle data center 950 includes a database, for example, the database 230 in FIG. 4. For example, the in-vehicle data center 950 may include a user information database and a real-time information database. The in-vehicle data center 950 may provide data for the calculation modules in the heat unit by using the bus.

There may be a plurality of cameras. For example, for a four-seat vehicle, there may be four cameras: a driver's camera 961, a front passenger's camera 962, a rear-row camera 963, and a rear-row camera 964. Like other sensors in the cockpit, the cameras may be connected to the gateway 930 via the CAN 970.

The gateway 930 is connected to the bus 940, and provides an access capability for another component and hardware.

Figure 15:
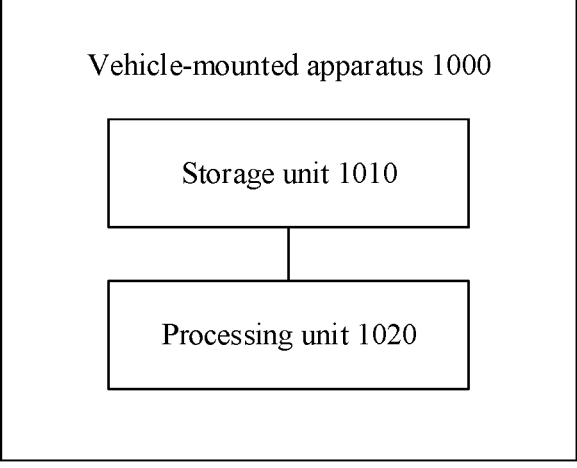
FIG. 15 is a schematic block diagram of a vehicle-mounted apparatus according to an embodiment of this application.

FIG. 15 is a schematic block diagram of a vehicle-mounted apparatus according to an embodiment of this application. A vehicle-mounted apparatus 1000 shown in FIG. 15 includes a storage unit 1010 and a processing unit 1020.

The storage unit 1010 and the processing unit 1020 may be configured to perform the in-vehicle user positioning method or the in-vehicle interaction method in embodiments of this application. Specifically, the processing unit 1020 may perform the method 300 or the method 500.

The storage unit 1010 is configured to store a mapping relationship between an in-vehicle user and an in-vehicle location. The processing unit 1020 is configured to: obtain a sound signal collected by an in-vehicle microphone; when a first voice command is recognized from the sound signal, determine a first user who sends the first voice command; obtain the mapping relationship between an in-vehicle user and an in-vehicle location; and determine an in-vehicle location of the first user based on the mapping relationship between an in-vehicle user and an in-vehicle location.

Optionally, in an embodiment, the processing unit 1020 is specifically configured to: perform voiceprint feature matching on the first voice command, to recognize the first user who sends the first voice command.

Optionally, in an embodiment, the mapping relationship between an in-vehicle user and an in-vehicle location is determined based on a face image collected by a vehicle-mounted camera.

Optionally, in an embodiment, that the mapping relationship between an in-vehicle user and an in-vehicle location is determined based on a location of the camera and the face image collected by the camera includes: obtaining user information; determining, based on a mapping relationship between the user information and the face image, a user corresponding to the face image; and determining an in-vehicle location of the user based on a location and/or an angle of the camera.

Optionally, in an embodiment, the processing unit 1020 is further configured to: perform sound source positioning based on the sound signal, to obtain at least one sound source location; and correct the in-vehicle location of the first user based on the in-vehicle location of the first user and the at least one sound source location.

Optionally, in an embodiment, the processing unit 1020 is specifically configured to determine, as a corrected in-vehicle location of the first user, a sound source location that is in the at least one sound source location and that is closest to the in-vehicle location of the first user.

Optionally, in an embodiment, the processing unit 1020 is further configured to execute the first voice command based on the in-vehicle location of the first user.

Optionally, in an embodiment, the processing unit 1020 is specifically configured to control a location of a projection interface based on the in-vehicle location of the first user.

It should be noted that the vehicle-mounted apparatus 1000 is embodied in a form of a functional unit. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (application-specific integrated circuit, ASIC), an electronic circuit, a processor (for example, a shared processor, a dedicated processor, or a group processor) configured to execute one or more software or firmware programs and a memory, a merged logic circuit, and/or another appropriate component that supports the described function.

Therefore, the units in the examples described in this embodiment of this application can be implemented by using electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 16:
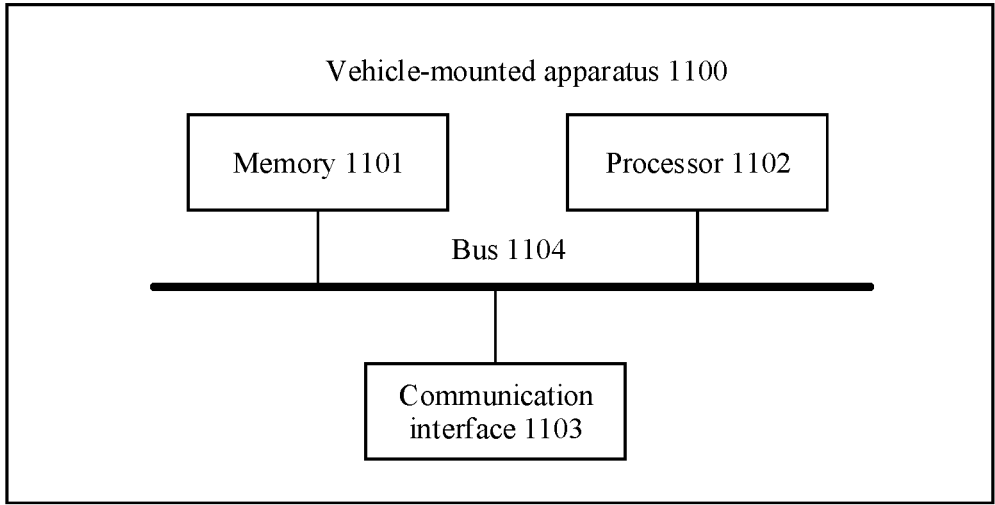
FIG. 16 is a schematic block diagram of a vehicle-mounted apparatus according to an embodiment of this application.

FIG. 16 is a schematic diagram of a hardware structure of a vehicle-mounted apparatus according to an embodiment of this application. The vehicle-mounted apparatus 1100 (the vehicle-mounted apparatus 1100 may be specifically a computer device) shown in FIG. 16 includes a memory 1101, a processor 1102, a communication interface 1103, and a bus 1104. A communication connection between the memory 1101, the processor 1102, and the communication interface 1103 is implemented through the bus 1104.

The memory 1101 may be a read-only memory (read-only memory, ROM), a static storage device, a dynamic storage device, or a random access memory (random access memory, RAM). The memory 1101 may store a program. When the program stored in the memory 1101 is executed by the processor 1102, the processor 1102 is configured to perform the steps of the in-vehicle user positioning method or the in-vehicle interaction method in embodiments of this application, for example, perform the steps shown in FIG. 5 or FIG. 8.

It should be understood that the vehicle-mounted apparatus shown in this embodiment of this application may be a server, for example, may be a cloud server, or may be a chip configured in a cloud server.

The processor 1102 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement the in-vehicle user positioning method or the in-vehicle interaction method in the method embodiments of this application.

Alternatively, the processor 1102 may be an integrated circuit chip, and has a signal processing capability. In an implementation process, the steps of the methods in this application may be implemented through an integrated logic circuit of hardware in the processor 1102, or instructions in a form of software.

The processor 1102 may alternatively be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1101. The processor 1102 reads information in the memory 1101, and completes, in combination with hardware of the processor 1102, functions that need to be performed by the unit included in the vehicle-mounted apparatus shown in FIG. 15 in embodiments of this application, or performs the method shown in FIG. 5 or FIG. 8 in the method embodiments of this application.

The communication interface 1103 implements communication between the vehicle-mounted apparatus 1100 and another device or a communication network by using a transceiver apparatus such as but not limited to a transceiver.

The bus 1104 may include a path for transmitting information between components (for example, the memory 1101, the processor 1102, and the communication interface 1103) of the apparatus 1100.

It should be noted that although only the memory, the processor, and the communication interface in the foregoing vehicle-mounted apparatus 1100 are shown, in a specific implementation process, a person skilled in the art should understand that the vehicle-mounted apparatus 1100 may further include another component required for implementing normal running. In addition, according to a specific requirement, a person skilled in the art should understand that the vehicle-mounted apparatus 1100 may further include a hardware component for implementing another additional function. In addition, a person skilled in the art should understand that the vehicle-mounted apparatus 1100 may include only components necessary for implementing embodiments of this application, but not necessarily include all components shown in FIG. 16.

It should also be understood that in embodiments of this application, the memory may include a read-only memory and a random access memory, and provide instructions and data to the processor. A part of the processor may further include a non-volatile random access memory. For example, the processor may further store information of a device type.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a universal serial bus flash disk (USB flash disk, UFD), a removable hard disk, a read-only memory (read-only memory, ROM), a random access memory (random access memory, RAM), a magnetic disk, or a compact disc. The UFD may also be briefly referred to as a USB flash drive or a USB flash drive.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An in-vehicle user positioning method, comprising:
obtaining, by an in-vehicle apparatus, a sound signal collected by an in-vehicle microphone;
in response to that a first voice command is recognized from the sound signal, determining, by the in-vehicle apparatus, a first user who sends the first voice command;
obtaining, by the in-vehicle apparatus, a mapping relationship between an in-vehicle user and an in-vehicle location;
determining, by the in-vehicle apparatus, an in-vehicle location of the first user based on the mapping relationship between the in-vehicle user and the in-vehicle location;
obtaining at least one in-vehicle sound source location by performing sound source positioning based on the sound signal;
correcting the in-vehicle location of the first user based on the in-vehicle location of the first user and the at least one in-vehicle sound source location, wherein the correcting comprises determining, as a corrected in-vehicle location of the first user, an in-vehicle sound source location that is in the at least one in-vehicle sound source location and that is closest to the in-vehicle location of the first user; and
controlling, by the in-vehicle apparatus, a rotation angle of a projector component based on the corrected in-vehicle location of the first user.

2. The method according to claim 1, wherein the determining a first user who sends the first voice command comprises:
recognizing the first user who sends the first voice command by performing voiceprint feature matching on the first voice command.

3. The method according to claim 1, wherein the mapping relationship between the in-vehicle user and the in-vehicle location is determined based on a face image collected by a vehicle-mounted camera.

4. The method according to claim 3, wherein that the mapping relationship between the in-vehicle user and the in-vehicle location is determined based on the face image collected by the vehicle-mounted camera comprises:
obtaining user information;
determining, based on a mapping relationship between the user information and the face image, a user corresponding to the face image; and
determining an in-vehicle location of the user based on at least one of a location or an angle of the vehicle-mounted camera.

5. The method according to claim 1, wherein the first voice command comprises turning on an air conditioner of a vehicle, and the method comprises: turning on the air conditioner corresponding to the corrected in-vehicle location of the first user.

6. An in-vehicle interaction method, comprising:
obtaining, by an in-vehicle apparatus, a sound signal collected by an in-vehicle microphone;
in response to that a first voice command is recognized from the sound signal, determining, by the in-vehicle apparatus, a first user who sends the first voice command;
obtaining, by the in-vehicle apparatus, a mapping relationship between an in-vehicle user and an in-vehicle location;
determining, by the in-vehicle apparatus, an in-vehicle location of the first user based on the mapping relationship between the in-vehicle user and the in-vehicle location;
obtaining at least one in-vehicle sound source location by performing sound source positioning based on the sound signal;
correcting the in-vehicle location of the first user based on the in-vehicle location of the first user and the at least one in-vehicle sound source location, wherein the correcting comprises determining, as a corrected in-vehicle location of the first user, an in-vehicle sound source location that is in the at least one in-vehicle sound source location and that is closest to the in-vehicle location of the first user; and
executing, by the in-vehicle apparatus, the first voice command based on the corrected in-vehicle location of the first user, wherein executing the first voice command based on the corrected in-vehicle location of the first user comprises:
controlling, by the in-vehicle apparatus, a rotation angle of a projector component based on the corrected in-vehicle location of the first user.

7. The method according to claim 6, wherein the executing the first voice command based on the in-vehicle location of the first user comprises:

controlling a location of a projection interface based on controlling the rotation angle of the projector component.

8. The method according to claim 6, wherein the first voice command comprises turning on an air conditioner of a vehicle, and the method comprises: turning on the air conditioner corresponding to the corrected in-vehicle location of the first user.

9. A vehicle-mounted apparatus, comprising:

a data storage configured to store a mapping relationship between an in-vehicle user and an in-vehicle location; and at least one processor coupled with one or more memories that store programming instructions for execution by the at least one processor to:

obtain a sound signal collected by an in-vehicle microphone;

in response to that a first voice command is recognized from the sound signal, determine a first user who sends the first voice command;

obtain the mapping relationship between an in-vehicle user and an in-vehicle location;

determine an in-vehicle location of the first user based on the mapping relationship between the in-vehicle user and the in-vehicle location;

obtain at least one in-vehicle sound source location by performing sound source positioning based on the sound signal;

correct the in-vehicle location of the first user based on the in-vehicle location of the first user and the at least one in-vehicle sound source location, wherein the correcting comprises determining, as a corrected in-vehicle location of the first user, an in-vehicle sound source location that is in the at least one in-vehicle sound source location and that is closest to the in-vehicle location of the first user; and control a rotation angle of a projector component based on the corrected in-vehicle location of the first user.

10. The apparatus according to claim 9, wherein the at least one processor coupled with the one or more memories that store the programming instructions for execution by the at least one processor to:

perform voiceprint feature matching on the first voice command, to recognize the first user who sends the first voice command.

11. The apparatus according to claim 9, wherein the mapping relationship between the in-vehicle user and the in-vehicle location is determined based on a face image collected by a vehicle-mounted camera.

12. The apparatus according to claim 11, wherein that the mapping relationship between the in-vehicle user and the in-vehicle location is determined based on a location of the vehicle-mounted camera and the face image collected by the vehicle-mounted camera comprises:

obtaining user information;

determining, based on a mapping relationship between the user information and the face image, a user corresponding to the face image; and determining an in-vehicle location of the user based on at least one of the location or an angle of the vehicle-mounted camera.

13. The apparatus according to claim 9, wherein the at least one processor coupled with the one or more memories that store the programming instructions for execution by the at least one processor to:

execute the first voice command based on the in-vehicle location of the first user.

14. The apparatus according to claim 13, wherein the at least one processor coupled with the one or more memories that store the programming instructions for execution by the at least one processor to:

control a location of a projection interface based on controlling the rotation angle of the projector component.

15. The apparatus according to claim 13, wherein the first voice command comprises turning on an air conditioner of a vehicle, and the at least one processor coupled with the one or more memories that store the programming instructions for execution by the at least one processor to:

turn on the air conditioner corresponding to the corrected in-vehicle location of the first user.

* * * * *